US011244309B2

(12) United States Patent
Bentov et al.

(10) Patent No.: US 11,244,309 B2
(45) Date of Patent: Feb. 8, 2022

(54) REAL-TIME CRYPTOCURRENCY EXCHANGE USING TRUSTED HARDWARE

(71) Applicant: Cornell University, Ithaca, NY (US)

(72) Inventors: Iddo Bentov, Ithaca, NY (US); Ari Juels, New York, NY (US); Fan Zhang, Ithaca, NY (US); Philip Daian, New York, NY (US); Lorenz Breidenbach, Zurich (CH)

(73) Assignee: Cornell University, Ithaca, NY (US)

( * ) Notice: Subject to any disclaimer, the term of this patent is extended or adjusted under 35 U.S.C. 154(b) by 378 days.

(21) Appl. No.: 16/198,223

(22) Filed: Nov. 21, 2018

(65) Prior Publication Data

US 2019/0156301 A1   May 23, 2019

Related U.S. Application Data

(60) Provisional application No. 62/589,715, filed on Nov. 22, 2017.

(51) Int. Cl.
*G06Q 20/38* (2012.01)
*G06Q 20/06* (2012.01)
(Continued)

(52) U.S. Cl.
CPC ..... *G06Q 20/38215* (2013.01); *G06Q 20/065* (2013.01); *G06Q 20/389* (2013.01);
(Continued)

(58) Field of Classification Search
None
See application file for complete search history.

(56) References Cited

U.S. PATENT DOCUMENTS

2015/0363769 A1   12/2015   Ronca et al.
2015/0363876 A1   12/2015   Ronca et al.
(Continued)

FOREIGN PATENT DOCUMENTS

WO   WO-2012069256 A1 *   5/2012   ............ G06Q 40/04
WO   2017145003 A1   8/2017
(Continued)

OTHER PUBLICATIONS

M. Andrychowicz et al., "Fair Two-Party Computations via Bitcoin Deposits," Financial Cryptography Workshops, Mar. 4, 2014, 15 pages.

(Continued)

*Primary Examiner* — Jacob C. Coppola
(74) *Attorney, Agent, or Firm* — Ryan, Mason & Lewis, LLP

(57) ABSTRACT

An apparatus in an illustrative embodiment comprises a processing platform that includes one or more processing devices each comprising a processor coupled to a memory. The processing platform is configured to communicate over at least one network with one or more additional sets of processing devices associated with at least a first blockchain-based cryptocurrency system. Each of at least a subset of the one or more processing devices of the processing platform comprises a trusted execution environment, such as a secure enclave. The processing platform is further configured to release from the trusted execution environment of a given one of the one or more processing devices of the processing platform a first blockchain transaction on the first blockchain-based cryptocurrency system, and to condition release of a second blockchain transaction relating to the first blockchain transaction on receipt of at least a specified threshold amount of evidence of confirmation of the first (Continued)

blockchain transaction on the first blockchain-based cryptocurrency system.

21 Claims, 16 Drawing Sheets

(51) Int. Cl.
    *H04L 9/08*           (2006.01)
    *G06Q 20/40*         (2012.01)
    *G06Q 20/02*         (2012.01)

(52) U.S. Cl.
    CPC ......... *G06Q 20/405* (2013.01); *H04L 9/0897* (2013.01); *G06Q 20/027* (2013.01); *G06Q 2220/00* (2013.01); *H04L 2209/38* (2013.01); *H04L 2209/56* (2013.01)

(56) References Cited

U.S. PATENT DOCUMENTS

| | | | | |
|---|---|---|---|---|
| 2016/0203477 | A1* | 7/2016 | Yang | ................. G06Q 20/3678 705/69 |
| 2016/0300222 | A1* | 10/2016 | Yang | .................... G06Q 20/065 |
| 2017/0154331 | A1 | 6/2017 | Voorhees | |
| 2017/0286951 | A1 | 10/2017 | Ignatchenko et al. | |
| 2019/0026705 | A1* | 1/2019 | Lee | .................... G06Q 20/3678 |
| 2019/0095910 | A1* | 3/2019 | Gumowski | ........ G06Q 20/3823 |

FOREIGN PATENT DOCUMENTS

| | | | |
|---|---|---|---|
| WO | 2017145004 A1 | 8/2017 | |
| WO | 2018127923 A1 | 7/2018 | |
| WO | WO-2018229632 A1 * | 12/2018 | ......... G06Q 20/3829 |

OTHER PUBLICATIONS

M. Andrychowicz et al., "Secure Multiparty Computations on Bitcoin," Proceedings of the IEEE Symposium on Security and Privacy, May 18-21, 2014, pp. 443-458.
Adam Back, "O(280) Theoretical Attack on P2SH," https://bitcointalk.org/index.php?action=printpage;topic=32443.0, Nov. 2, 2013, 3 pages.
Clare Baldwin, "Bitcoin Worth $72 Million Stolen fro Bitfinex Exchange in Hong Kong," https://www.reuters.com/article/us-bitfinex-hacked-hongkong-idUSKCN10E0KP, Aug. 3, 2016, 3 pages.
Andrew Barisser, "High Frequency Trading on the Coinbase Exchange," https://medium.com/on-banking/high-frequency-trading-on-the-coinbase-exchange-f804c80f507b, Apr. 24, 2015, 5 pages.
M. Bartoletti et al., "An Analysis of Bitcoin OP_RETURN Metadata," Financial Cryptography 4th Bitcoin Workshop, Mar. 1, 2017, 18 pages.
D. Beaver et al., "Multiparty Computation with Faulty Majority, Extended Announcement," Proceedings of the 30th Annual Symposium on Foundations of Computer Science (SFCS), Oct. 30-Nov. 1, 1989, pp. 468-473.
Jethro Beekman, "A Denial of Service Attack Against Computations Using Bitcoin Deposits," Information Processing Letters, Feb. 2016, pp. 144-146, vol. 116, No. 2.
Juan Benet, "IPFS is the Distributed Web," https://ipfs.io/, 2018, 4 pages.
I. Bentov et al., "Cryptocurrencies without Proof of Work," Financial Cryptography Bitcoin Workshop, Jan. 11, 2017, 18 pages.
I. Bentov et al., "Tortoise and Hares Consensus: the Meshcash Framework for Incentive-Compatible, Scalable Cryptocurrencies," http://eprint.iacr.org/2017/300, Apr. 1, 2017, 47 pages.
I. Bentov et al., "How to Use Bitcoin to Design Fair Protocols," CRYPTO, Part II, 2014, pp. 421-439.
I. Bentov et al., "Instantaneous Decentralized Poker," International Conference on Theory and Application of Cryptography and Information Security, Feb. 11, 2017, 48 pages.

I. Bentov et al., "Proof of Activity: Extending Bitcoin's Proof of Work via Proof of Stake," ACM Sigmetrics Performance Evaluation Review, Dec. 2014, pp. 34-37, vol. 42, No. 3.
I. Bentov et al., "Decentralized Prediction Market Without Arbiters," Financial Cryptography 4th Bitcoin Workshop, Mar. 7, 2017, 18 pages.
Bitbay, "BitBay—Official Crypto-Currency Coin, Decentralized Markets, Unbreakable Smart Contracts," http://bitpay.market/, 2019, 7 pages.
Daniel G. Brown, "How I Wasted Too Long Finding a Concentration Inequality for Sums of Geometric Variables," https://cs.uwaterloo.ca/~browndg/negbin.pdf, 2011, 3 pages.
Coinmarketcap, "Top 100 Tokens by Market Capitalization," https://coinmarketcap.com/assets/, Dec. 11, 2018, 10 pages.
Bitcointalk, "Alt Chains and Atomic Transfers," https:/bitcointalk.org/indes.php?topic=193281.msg2224949#msg2224949, 2013, 19 pages.
J. Clark et al., "On Decentralizing Prediction Markets and Order Books," 13th Annual Workshop on the Economics of Information Security (WEIS), Jun. 23-24, 2014, 21 pages.
K. Croman et al., "On Scaling Decentralized Blockchains," Financial Cryptography 3rd Bitcoin Workshop, 2016, 16 pages.
Tether.To, "Tether: Flat Currencies on the Bitcoin Blockchain," https://tether.to/wp-content/uploads/2016/06/TetherWhitePaper.pdf, 2016, 20 pages.
I. Bentov et al., "Snow White: Provably Secure Proofs of Stake," IACR Cryptology ePrint Archive, 2016, 62 pages.
C. Decker et al., "A Fast and Scalable Payment Network with Bitcoin Duplex Micropayment Channels," 17th Stabilization, Safety and Security of Distributed Systems (SSS), Aug. 2015, 17 pages.
Y. Desmedt et al., "Threshold Cryptosystems," Proceedings of Advances in Cryptology (CRYPTO), 1989, pp. 307-315.
R. Dingledine et al., "Tor: The Second-Generation Onion Router," Proceedings of the 13th Conference on USENIX Security Symposium (SSYM), Aug. 9-13, 2004, 18 pages, vol. 13.
D.P. Dubhashi et al., "Concentration of Measure for the Analysis of Randomised Algorithms—Draft," Cambridge University Press, Oct. 21, 2005, 207 pages.
T. Duong et al., "Securing Bitcoin-Like Backbone Protocols Against a Malicious Majority of Computing Power," IACR Cryptology ePrint Archive, Jul. 21, 2016, 33 pages.
B.A. Fisch et al., "Iron: Functional Encryption Using Intel SGX," Proceedings of the ACM SIGSAC Conference on Computer and Communications Security (CCS), Oct. 30-Nov. 3, 2017, pp. 765-782.
J.A. Garay et al., "The Bitcoin Backbone Protocol: Analysis and Applications," Eurocrypt, 2015, 44 pages.
R. Gennaro et al., "Threshold-Optimal DSA/ECDSA Signatures and an Application to Bitcoin Wallet Security," Proceedings of the 14th International Conference of Applied Cryptography and Network Security (ACNS), Jun. 19-22, 2016, pp. 156-174.
Y. Gilad et al., "Algorand: Scaling Byzantine Agreements for Cryptocurrencies," Proceedings of the 26th Symposium on Operating Systems Principles (SOSP), Oct. 28, 2017, pp. 51-68.
S. Goldfeder et al., "Escrow Protocols for Cryptocurrencies: How to Buy Physical Goods Using Bitcoin," International Conference on Financial Cryptography and Data Security, 2017, pp. 321-339.
S. Goldwasser et al., "Fair Computation of General Functions in Presence of Immoral Majority," Proceedings of the 10th Annual International Cryptology Conference on Advances in Cryptology (CRYPTO), Aug. 11-15, 1990, pp. 77-93.
Bitfury Group, "Proof of Stake Versus Proof of Work," http://bitfury.com/content/5-white-papers-research/pos-vs-pow-1.0.2.pdf, Version 1.0, Sep. 13, 2015, 26 pages.
J. Hallgren et al., "Hallex: A Trust-Less Exchange System for Digital Assets," https://ssrn.com/abstract=2917078, Feb. 15, 2017, 4 pages.
E. Heilman et al., "TumbleBit: An Untrusted Bitcoin-Compatible Anonymous Payment Hub," Network and Distributed System Security Symposium (NDSS), Feb. 26-Mar. 1, 2017, 15 pages.

(56) References Cited

OTHER PUBLICATIONS

S. Johnson et al., "Intel Software Guard Extensions: EPID Provisioning and Attestation Services," https://software.intel.com/en-us/blogs/2016/03/09/intel-sgx-epid-provisioning-and-attestation-services, 2016, 10 pages.
A. Kiayias et al., "Ouroboros: A Provably Secure Proof-of-Stake Blockchain Protocol," International Association for Cryptologic Research (CRYPTO), Part I, 2017, pp. 357-388.
A. Kiayias et al., "Fair and Robust Multi-Party Computation Using a Global Transaction Ledger," Proceedings of the 35th Annual International Conference on Advances in Cryptology (EUROCRYPT), Part II, May 8-12, 2016, pp. 705-734, vol. 9666.
Sophie Knight, "Mt. Gox Says it Found 200,000 Bitcoins in 'Forgotten' Wallet," http://www.reuters.com/article/us-bitcoin-mtgox-wallet-idUSBREA2K05N20140321, Mar. 20, 2014, 2 pages.
A. Kosba et al., "Hawk: The Blockchain Model of Cryptography and Privacy-Preserving Smart Contracts," IEEE Symposium on Security and Privacy, 2016, pp. 839-858.
Leslie Lamport, "The Part-Time Parliament," ACM Transactions on Computer Systems (TOCS), May 1998, pp. 133-169, vol. 16, No. 2.
Y. Lewenberg et al., "Bitcoin Mining Pools: A Cooperative Game Theoretic Analysis," Proceedings of the 14th International Conference on Autonomous Agents and Multiagent Systems (AAMAS), May 4-8, 2015, pp. 919-927.
H-Y. Lin et al., "Fair Reconstruction of a Secret," Information Processing Letters, 1995, pp. 45-47.
J. Lind et al., "Teechan: Payment Channels Using Trusted Execution Environments," Financial Cryptography 4th Bitcoin Workshop, 2017, 16 pages.
Mappum, "Mercury—Fully Trustless Cryptocurrency Exchange," https://bitcointalk.org/index.php?topic=946174.0, Feb. 2015, 11 pages.
S. Matetic et al., "ROTE: Rollback Protection for Trusted Execution," Proceedings of the 26th USENIX Security Symposium, Aug. 16-18, 2017, pp. 1289-1306.
P. McCorry et al., "Towards Bitcoin Payment Networks," Proceedings of the 21st Australasian Conference on Information Security and Privacy, Jul. 4-6, 2016, pp. 57-76, vol. 9722.
Robert McMillan, "$1.2M Hack Shows Why You Should Never Store Bitcoins on the Internet," https://www.wired.com/2013/11/inputs/, Nov. 7, 2013, 2 pages.
Satoshi Nakamoto, "Bitcoin: A Peer-to-Peer Electronic Cash System," http://bitcoin.org/bitcoin.pdf, 2008, 9 pages.
Omni, "An Open-Source, Fully-Decentralized Asset Platform on the Bitcoin Blockchain," http://www.omnilayer.org/, 2017, 8 pages.
S. Park et al., "Spacement: A Cryptocurrency Based on Proofs of Space," IACR Cryptology ePrint Archive, 2015, 29 pages.
R. Pass et al., "Analysis of the Blockchain Protocol in Asynchronous Networks," http://eprint.iacr.org/2016/454, Eurocrypt, 2017, 40 pages.
R. Pass et al., "Formal Abstractions for Attested Execution Secure Processors," Eurocrypt, 2017, 80 pages.
A. Poelstra et al., "Confidential Assets," https://blockstream.com/bitcoin17-final41.pdf, Financial Cryptography Bitcoin Workshop, 2018, 21 pages.
J. Poon et al., "The Bitcoin Lightning Network: Scalable Off-Chain Instant Payments," https://lightning.network/lightning-network-paper.pdf, Draft Version 0.5.9.2, 2016, 59 pages.
R. Bahmani et al., "Secure Multiparty Computation from SGX," Financial Cryptography, 2017, 38 pages.
E. Portnoy et al., "Intel's Management Engine is a Security Hazard, and Users Need a Way to Disable It," https://www.eff.org/deeplinks/2017/05/intels-management-engine-security-hazard-and-users-need-way-disable-it, May 8, 2017, 4 pages.
Meni Rosenfeld, "Overview of Colored Coins," https://bitcoil.co.il/BitcoinX.pdf, Dec. 4, 2012, 13 pages.

Meni Rosenfeld, "Analysis of Hashrate-Based Double-Spending," http://arxiv.org/abs/1402.2009, Feb. 12, 2014, 13 pages.
T. Ruffing et al., "P2P Mixing and Unlinkable Bitcoin Transactions," NDSS, Feb. 26-Mar. 1, 2017, 15 pages.
F. Schuster et al., "VC3: Trustworthy Data Analytics in the Cloud Using SGX," Proceedings of the IEEE Symposium on Security and Privacy (SP), May 17-21, 2015, pp. 38-54.
Shapeshift, "ShapeShift/Cryptocurrency Exchange/Simple Coin Conversion," https://shapeshift.io/, 2019, 2 pages.
R. Strackx et al., "Ariadne: A Minimal Approach to State Continuity," Proceedings of the 25th USENIX Security Symposium, Aug. 10-12, 2016, pp. 875-892.
Paul Sztorc, "BitUSD Isn't Worth the Trouble," http://www.truthcoin.info/blog/bitusd/, Jan. 29, 2015, 11 pages.
F. Tramèr et al., "Sealed-Glass Proofs: Using Transparent Enclaves to Prove and Sell Knowledge," IEEE European Symposium on Security and Privacy (Euro S&P), Apr. 1, 2017, pp. 19-34, vol. 2016.
Dr. Gavin Wood, "Ethereum: A Secure Decentralised Generalised Transaction Ledger," http://gavwood.com/paper.pdf, EIP-150 Revision, 2014, 32 pages.
Peter Wuille et al., "Technology Roadmap—Schnorr Signatures and Signature Aggregation," https://bitcoincore.org/en/2017/03/23/schnorr-signature-aggregation/, Mar. 23, 2017, 4 pages.
Joseph Young, "China Imposes New Capital Controls; Bitcoin Price Optimistic," https://cointelegraph.com/news/china-imposes-new-capital-controls-bitcoin-price-optimistic, Nov. 27, 2016, 3 pages.
F. Zhang et al., "Town Crier: An Authenticated Data Feed for Smart Contracts," Proceedings of the ACM SIGSAC Conference on Computerand Communications Security (CCS), Oct. 24-28, 2016, pp. 270-282.
Stan Higgins, "AlphaPoint to Secure Blockchain Assets with Intel's SGX Tech," https://www.coindesk.com/alphapoint-to-secure-blockchain-assets-with-intels-sgx-tech/, Oct. 18, 2017, 2 pages.
Alex Wearn, "IDEX is LIVE—The First Real-Time Decentralized Exchange," https://medium.com/aurora-dao/idex-decentralized-exchange-89111ad0503c, Sep. 29, 2017, 3 pages.
D. Dubhashi et al., "Concentration of Measure for Randomized Algorithms: Techniques and Analysis," Chapter 1, Oct. 21, 2005, 10 pages.
Bisq.Network, "Bisq—The Peer-to-Peer Bitcoin Exchange," https://docs.bisq.network/exchange/whitepaper.html, Oct. 29, 2019, 14 pages.
Vitalik Buterin, "A Next Generation Smart Contract & Decentralized Application Platform," Ethereum White Paper, http://githut.com/ethereum/wiki/wiki/White-Paper, 2013, 36 pages.
DREE12, "List of Major Bitcoin Heists, Thefts, Hacks, Scams, and Losses," https://bitcointalk.org/index.php, Nov. 16, 2014, 35 pages.
Litecoin.org, "Open Source P2P Digital Currency," http://litecoin.org/, 2019, 2 pages.
F. Vogelsteller et al., "EIP 20: ERC-20 Token Standard Source," https://github/eips.ethereum.org/eips/eip-20, Nov. 19, 2015, 3 pages.
Peter Todd, "Op_Checklocktimeverify," https://github.com/bitcoin/bips/blob/master/bip-0065.mediawiki, Oct. 1, 2014, 10 pages.
P. Wuille et al., "Optimized C Library for EC Operations on Curve secp256k1," https://github.com/bitcoin-core/secp256k1, 2015, 3 pages.
M. Tran et al., "Obscuro: A Bitcoin Mixer Using Trusted Execution Environments," Annual Computer Security Applications Conference (ACSAC), Dec. 3-7, 2018, pp. 692-701.
F. Shuh et al., "BitShares 2.0: General Overview," https://cryptorating.eu/whitepapers/BitShares/bitshares-general.pdf, Apr. 4, 2017, 10 pages.
Bitcoin Wiki, "Coinprism," https://en.bitcoin.it/wiki/Coinprism, May 16, 2018, 4 pages.
Bitcoin Wiki, "Colored Coins," https://en.bitcoin.it/wiki/Colored_Coins, Apr. 24, 2019, 8 pages.

\* cited by examiner

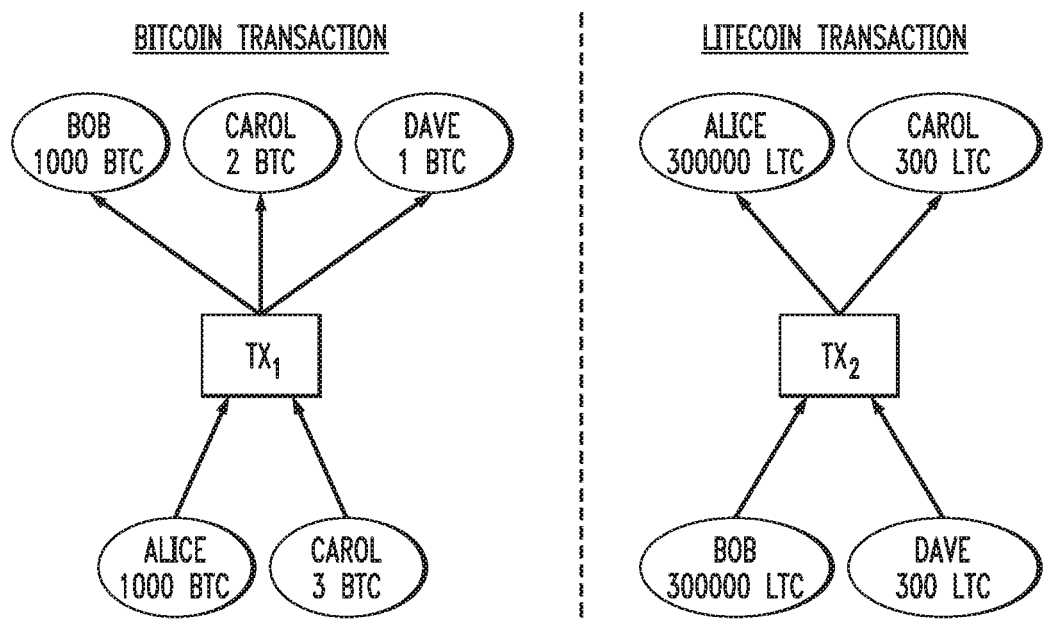

FIG. 6

Protocol $\Pi_{simp}$

1. The enclave picks a symmetric key $K \in \{0,1\}^\lambda$.
2. The enclave embeds $K$ into $TX_1$, $TX_2$.
3. The enclave sends $ct = encrypt_K(TX_1, TX_2)$ to $S_1, S_2, ..., S_N$.
4. The enclave waits for acknowledgements from $S_1, S_2, ..., S_N$.
5. The enclave broadcasts $TX_1$ to $C_1$ and $TX_2$ to $C_2$.
6. Each $S_i$ that sees $TX_i$ but not $TX_{3-i}$ will fetch $K$ from $TX_i$, decrypt $ct$, and broadcast $TX_{3-i}$ to $C_{3-i}$.

FIG. 7

Functionality RMIT (refundable multi-input transaction)

<u>Notation:</u> let $C$ be a cryptocurrency system.

Upon receiving $tx = (\{in_1, ..., in_k\}, \{out_1, ..., out_n\}, \phi_1, \phi_2)$ 1. Verify $\forall j \in [k] : in_j$ is unspent in $C$.
   - If the verification failed then abort.
2. Verify $\sum_{j=1}^{k} amount(in_j) \geq \sum_{j=1}^{n} amount(out_j)$.
   - If the verification failed then abort.
3. Make $\{in_1, ..., in_k\}$ unspendable in $C$.
4. Wait to receive a witness $w$
   (a) If $\phi_1(w) = 1$ then commit $\{out_1, ..., out_n\}$ to $C$, and terminate.
   (b) If $\phi_2(w) = 1$ then make $\{in_1, ..., in_k\}$ spendable in $C$, and terminate.
   (c) Otherwise, return to Step 4.

Predicate $\phi'_1$

Hardcoded parameters: $TX_1$, $D_0$, $\ell_1$, $\ell_2$
Input: $w = ((v_1, d_1), (v_2, d_2),..., (v_k, d_k), H_1, H_2,..., H_{\ell_2})$
1. Embed hash($TX_{1,1}$) into $y$
2. For $j = 1$ to min($k, \ell_1$)
     If $d_j = $ 'L' then $y := $ hash($y, v_j$) else $y := $ hash($v_j, y$)
3. For $j = 1$ to $\ell_2$
     $y := $ hash($y, H_j$)
     If $y > D_0$ then return false
4. return true

---

Predicate $\phi'_2$

Hardcoded parameters: $TX_1$, $D_0$, $\ell_1$, $\ell_2$, $\ell_3$, $b_1$
Input: $w = (G_1,..., G_n, (v_1, d_1),..., (v_k, d_k), H_1,..., H_{\ell_2})$
1. $z := b_1$
2. For $j = 1$ to max($n, \ell_3$)
     $z := $ hash($z, G_j$)
     If $z > D_0$ then return false
3. Embed hash($TX_{1,2}$) into $y$
4. For $j = 1$ to min($k, \ell_1$)
     If $d_j = $ 'L' then $y := $ hash($y, v_j$) else $y := $ hash($v_j, y$)
5. If $y \neq z$ then return false
6. For $j = 1$ to $\ell_2$
     $y := $ hash($y, H_j$)
     If $y > D_0$ then return false
7. return true

Protocol $\Pi_{prac}$

1. Tesseract sends $ct = \text{encrypt}_K(TX_1, TX_2, TX_1^c, TX_2^c)$ to $S_1, S_2, ..., S_N$.

2. For every $i \in [N]$, Tesseract waits for acknowledgement from $S_i$ that it received $ct$.

3. Tesseract broadcasts $TX_1$ to the system $C_1$.

4. Starting from the time at which it received $ct$ in Step 1, each server $S_i \in \{S_1, S_2, ..., S_N\}$ inspects the next blocks of the system $C_1$

- If $S_i$ does not see $TX_1$ on $C_1$ within $T_1$ blocks, then it broadcasts $TX_1^c$ to $C_1$.

- If $S_i$ sees that $TX_1$ is confirmed on $C_1$, then it broadcasts $TX_2$ to the system $C_2$.

- If $S_i$ sees that $TX_1^c$ is confirmed on $C_1$, then it broadcasts $TX_2^c$ to the system $C_2$.

*FIG. 13*

Protocol $\Pi_{grad}$

1. The enclave picks a random symmetric key $K \in \{0, 1\}^\lambda$ such that $K = (w_1, w_2, ..., w_q)$, $w_i \in \{0, 1\}^m$, $\lambda = q \cdot m$.

2. The enclave creates $ct = \text{encrypt}_K(TX_1, TX_2)$.

3. For $w_i \in \{w_1, w_2, ..., w_q\}$, the enclave creates $N$-out-of-$N$ additive secret shares of $w_i$, including dummy secrets.
   - The enclave picks a random $\alpha \in [s-1]$.
   - For $\ell \in [d] \setminus \{\alpha, \alpha+1\}$ For each $j \in [N]$, the enclave picks random shares $x_i^{\ell, j} \in GF(2^\lambda)$ conditioned upon $\sum_{j=1}^{N} x_i^{\ell, j} \neq 0$.
   - For $\ell = \alpha + 1$ For each $j \in [N]$, the enclave picks random shares $x_i^{\ell, j} \in GF(2^\lambda)$ conditioned upon $\sum_{j=1}^{N} x_i^{\ell, j} = 0$.
   - For $\ell = \alpha$ For each $j \in [N]$, the enclave picks random shares $x_i^{\ell, j} \in GF(2^\lambda)$ conditioned upon the $m$ least significant bits of $\sum_{j=1}^{N} x_i^{\ell, j}$ being equal to $w_i$ and $\sum_{j=1}^{N} x_i^{\ell, j} \neq 0$.

4. For every $i \in [q]$, $\ell \in [d]$, $j \in [N]$
   - The enclave creates a signature $\sigma_i^{\ell, j}$ for the share $x_i^{\ell, j}$.

5. For each $j \in [N]$
   - The enclave sends $(ct, \{x_i^{\ell, j}, \sigma_i^{\ell, j}\}_{i \in [q], \ell \in [d]})$ to $S_j$ via a secure channel.

6. For each $i \in [q]$
   - The servers $S_1, S_2, ..., S_N$ reconstruct $w_i$ by sending their signed shares in the sequential order $(x_i^{1,1}, \sigma_i^{1,1}), ..., (x_i^{1,N}, \sigma_i^{1,N}), (x_i^{2,1}, \sigma_i^{2,1}), ...$, until the indicator $\sum_{j=1}^{N} x_i^{\alpha+1, j} = 0$ is found.

If some corrupt server $S_j$ does not send $(x_i^{\ell, j}, \sigma_i^{\ell, j})$ within $\tau$ time, then the honest servers begin an exhaustive search for the key $K$.

7. Any server that decrypts $ct$ will broadcast $TX_1$ to $C_1$ and $TX_2$ to $C_2$.

FIG. 16

Protocol $\Pi_{\text{RTExch}}$

Let $S_1, S_2, ..., S_N$ be SGX-enabled servers.
Exemplary parameters. $d_0 = 5$, $n_0 = 288$.

- For every $i \in [N]$.
  - The server $S_i$ initializes $L_i := 1$ as the leader index and $J_i := 0$ as the first epoch.
- Let $L$ denote the index the server with $L_i = i$.
- *Communication with traders.*
  - The server $S_L$ accepts trade requests from new and existing users, and updates their account balances in the data structures that are inside its SGX enclave.
- *Synchronization with the other servers:* $J_L \bmod n_0 \neq 0$.
  - After each epoch of $d_0$ minutes.
    * $S_L$ sets $J_L := J_L + 1$.
    * $S_L$ creates $m = (J_L, \text{encrypt}_{sk}(dat))$, where $dat$ is its entire enclave data.
    * $S_L$ sends $m$ to the servers $\{S_i\}_{i \neq L}$.
    * Any server $S_i$ that received $m$ will set $J_i := J_L$.
    * Servers that did not receive $m$ will invoke the Synod algorithm to update $L$ to a new leader.
      - If a new leader was elected, aware servers will inform the users by publishing the index of the new leader (with remote attestation).
- *All-or-nothing settlement:* $J_L \bmod n_0 = 0$.
  - $S_L$ invokes $\Pi_{\text{prac}}$ with the following modifications.
    * In Step 1 of $\Pi_{\text{prac}}$, $S_L$ sends $m = (J_L, ct)$, where $ct = \text{encrypt}_{sk}(\text{TX}_1, \text{TX}_2, \text{TX}_1^c, \text{TX}_2^c)$.
    * In Step 2 of $\Pi_{\text{prac}}$, $S_L$ waits for acknowledgements from $\frac{n+1}{2}$ or more servers.
  - For every $i \in [N]$.
    * If $S_i$ observes that $\text{TX}_1$ was confirmed on $C_1$ and $\text{TX}_2$ was confirmed on $C_1$, then it updates $J_i := J_L + 1$ and proceeds to the next epoch.

*FIG. 17*

```
typedef unsigned long long cointype;

time_t renew(time_t timestamp, long user_id, cointype fee) {
    if (book.find(user_id) == book.end()
        || timestamp + RENEW_PERIOD > book[user_id].timeout
        || book[user_id].left < fee) {
        return -1;
    } else {
        book[user_id].volume -= fee;
        book[user_id].left -= fee;

timestamp = max(book[user_id].timeout,
                        timestamp + DEPOSIT_PERIOD);
        book[user_id].timeout = timestamp;
        return timestamp;
    }
}
```

*FIG. 18*

```
typedef unsigned char byte;

bool verifyMerklePath(const byte* root, const byte* leaf,
                      const byte** branch, int length) {
    byte curr[SHA256_DIGEST_LENGTH];

memcpy(curr, leaf, SHA256_DIGEST_LENGTH);
    byte_swap(curr, SHA256_DIGEST_LENGTH);
    for(int i=0; i<length; ++i) {
        if( (branch[i]).empty() ) {
            sha256double(curr, curr, curr);
            continue;
        }
        if('L' == branch[i][0])
            sha256double(1+branch[i], curr, curr);
        else
            sha256double(curr, 1+branch[i], curr);
    }
    byte_swap(curr, SHA256_DIGEST_LENGTH);
    return memcmp(curr, root, SHA256_DIGEST_LENGTH);
}
```

*FIG. 19*

```
typedef byte digest[SHA256_DIGEST_LENGTH];

void recursiveMerk(const digest* level, int size, int path) {
    int k = (size + (size & 1))/2;
    digest * next = new digest[k];

for(int i=0; i<k; ++i){
        const byte * left_node = level[2*i];
        const byte * right_node =
            ((2*i + 1) == size ? left_node : level[2*i+1]);
        sha256double(left_node, right_node, next[i]);
        if(path == (2*i+1)) {
            cout << "L: ";
            hexdump(left_node, SHA256_DIGEST_LENGTH);
            continue;
        }
        if(path == (2*i)) {
            cout << "R: ";
            if(left_node != right_node)
                hexdump(right_node, SHA256_DIGEST_LENGTH);
            else
                cout << endl;
        }
    }
    if (k>1)
        recursiveMerk(next,k,path/2);
    else {
        byte_swap(next[0], SHA256_DIGEST_LENGTH);
        hexdump(next[0], SHA256_DIGEST_LENGTH);
    }
    delete[] next;
} void merkGenPath(const byte** leaves, int size, int index) {
    arrdigest * mTree = new arrdigest[size];

for(int i=0; i<size; ++i) {
        byte * tmp = mTree[i];
        memcpy(tmp, (base64_decode(leaves[i])).data(), 32);
        byte_swap(tmp, 32);
    } if (size>1) recursiveMerk(mTree,size,index);

delete[] mTree;
}
```

REAL-TIME CRYPTOCURRENCY EXCHANGE USING TRUSTED HARDWARE

PRIORITY CLAIM

The present application claims priority to U.S. Provisional Patent Application Ser. No. 62/589,715, filed Nov. 22, 2017 and entitled "Tesseract: Real-Time Cryptocurrency Exchange Using Trusted Hardware," which is incorporated by reference herein in its entirety.

STATEMENT OF GOVERNMENT SUPPORT

This invention was made with government support under Contract Nos. CNS-1330599 and CNS-1704615 awarded by the National Science Foundation. The government has certain rights in the invention.

FIELD

The field relates generally to information security, and more particularly to techniques for secure implementation of cryptocurrency transactions.

BACKGROUND

A variety of different cryptocurrencies, including Bitcoin, Ethereum and Litecoin, are coming into increasingly widespread use. However, significant problems can arise when a user holding an amount of one cryptocurrency would like to exchange it for an amount of a different cryptocurrency. For example, existing systems for cryptocurrency exchange are highly vulnerable to so-called "frontrunning" attacks that can prevent users from achieving a fair exchange rate.

Such systems are also vulnerable to other attacks that can lead to theft or other loss of cryptocurrency assets. These and other conventional arrangements are unable to achieve real-time cross-trading between multiple independent cryptocurrency systems in a manner that provides adequate security against frontrunning attacks and other types of attacks.

SUMMARY

Illustrative embodiments of the invention provide techniques for real-time cryptocurrency exchange using trusted hardware. For example, some embodiments provide a processing platform that implements a real-time cryptocurrency exchange service configured to prevent frontrunning attacks as well as other types of attacks that could lead to theft or other loss of cryptocurrency assets. A given such embodiment illustratively provides secure real-time cross-trading between multiple independent cryptocurrency systems. These and other embodiments are advantageously configured to ensure "all-or-nothing" fairness in conjunction with exchanges of cryptocurrency assets of different cryptocurrency systems.

Similar advantages are provided for other types of cryptocurrency transactions in other contexts involving one or more cryptocurrency systems. For example, some embodiments are configured to tokenize assets that are pegged to various cryptocurrencies. As a more particular example, a given illustrative embodiment of this type can be configured to tokenize Bitcoin-denominated cryptocurrency assets for circulation on the Ethereum blockchain in order to facilitate usage of those assets in smart contracts. Numerous other cryptocurrency processing contexts are improved in other embodiments.

An apparatus in one illustrative embodiment comprises a processing platform that includes one or more processing devices each comprising a processor coupled to a memory. The processing platform is configured to communicate over at least one network with one or more additional sets of processing devices associated with at least a first blockchain-based cryptocurrency system.

Each of at least a subset of the one or more processing devices of the processing platform comprises a trusted execution environment, such as a secure enclave. The processing platform is further configured to release from the trusted execution environment of a given one of the one or more processing devices of the processing platform a first blockchain transaction on the first blockchain-based cryptocurrency system, and to condition release of a second blockchain transaction relating to the first blockchain transaction on receipt of at least a specified threshold amount of evidence of confirmation of the first blockchain transaction on the first blockchain-based cryptocurrency system.

In some embodiments, the processing platform comprises a plurality of processing devices each comprising a trusted execution environment, such as a secure enclave implemented using software guard extensions (SGX) functionality of a corresponding processor. The processing devices of the processing platform share a symmetric secret key or other type of cryptographic key that is secured within their respective trusted execution environments. The processing devices implement respective servers with each such server illustratively configured to execute a corresponding instance of a leader election protocol. The leader election protocol under specified conditions rotates a leader designation among the servers.

Although illustrative embodiments are described herein primarily in the context of particular cryptocurrency systems such as Bitcoin, Ethereum and Litecoin, the disclosed arrangements can be adapted in a straightforward manner for use with a wide variety of other types of cryptocurrency systems and associated cryptocurrency assets.

These and other embodiments of the invention include but are not limited to systems, methods, apparatus, processing devices, integrated circuits, and processor-readable storage media having software program code embodied therein.

BRIEF DESCRIPTION OF THE FIGURES

FIG. 3 shows an example of a frontrunning attack.

FIG. 4 illustrates a cross-chain settlement problem.

FIG. 6 is a protocol diagram showing a first example protocol for fair settlement in an illustrative embodiment.

FIG. 7 illustrates refundable multi-input transaction functionality.

FIG. 9 illustrates cryptocurrency scripts for respective predicates.

FIG. 12 is a protocol diagram showing a third example protocol for fair settlement in an illustrative embodiment.

FIG. 13 is a protocol diagram showing a fourth example protocol for fair settlement in an illustrative embodiment.

FIG. 16 is a protocol diagram showing a fifth example protocol for fair settlement in an illustrative embodiment.

FIGS. 17, 18 and 19 show example pseudocode for implementing respective portions of the protocol of FIG. 16.

DETAILED DESCRIPTION

Embodiments of the invention can be implemented, for example, in the form of information processing systems comprising computer networks or other arrangements of networks, clients, servers, processing devices and other components. Illustrative embodiments of such systems will be described in detail herein. It should be understood, however, that embodiments of the invention are more generally applicable to a wide variety of other types of information processing systems and associated networks, clients, servers, processing devices or other components. Accordingly, the term "information processing system" as used herein is intended to be broadly construed so as to encompass these and other arrangements.

Figure 1:
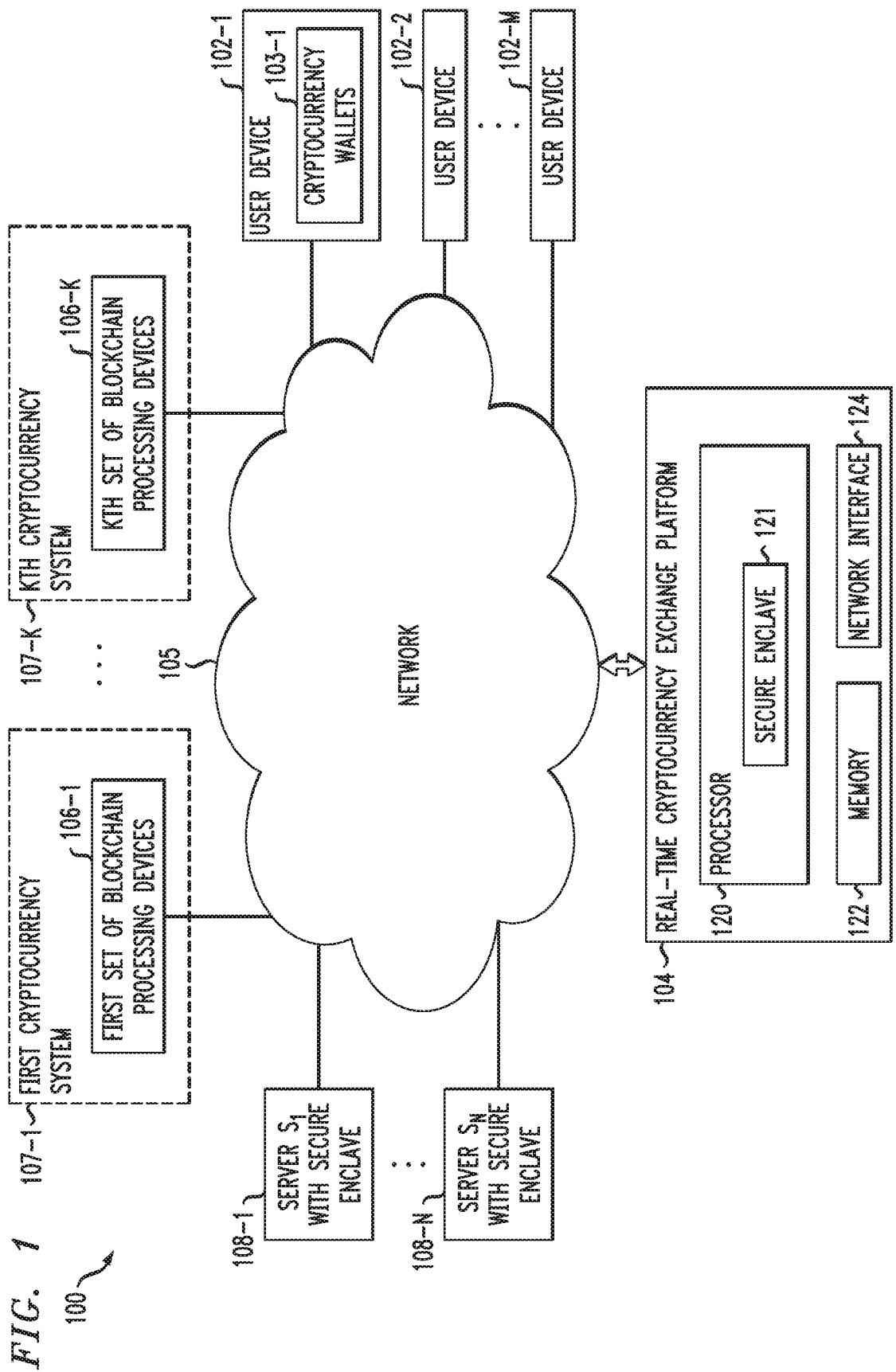
FIG. 1 is a block diagram of an information processing system configured with functionality for real-time cryptocurrency exchange using trusted hardware in an illustrative embodiment.

FIG. 1 shows an information processing system 100 implementing functionality for real-time cryptocurrency exchange using trusted hardware in an illustrative embodiment. The system 100 comprises a plurality of user devices 102-1, 102-2, . . . 102-M. Each of the user devices 102 is assumed to comprise at least one cryptocurrency wallet, such as cryptocurrency wallets 103-1 in user device 102-1. The system 100 further comprises a real-time cryptocurrency exchange platform 104. The user devices 102 are configured to communicate with the real-time cryptocurrency exchange platform 104 over a network 105. The user devices 102 of the FIG. 1 embodiment can each comprise, for example, a laptop computer, tablet computer or desktop personal computer, a mobile telephone, or another type of computer or communication device, as well as combinations of multiple such devices.

It should be noted that the term "user" herein is intended to be broadly construed so as to encompass various arrangements of human, hardware, software or firmware entities, as well as combinations of such entities, associated with one or more processing devices. References herein to users such as Alice and Bob should therefore be broadly construed so as to encompass corresponding processing devices.

Communications between the various elements of system 100 are assumed to take place over one or more networks collectively represented by network 105 in the figure. The network 105 can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

Also coupled to the network 105 are sets of blockchain processing devices 106-1, 106-2, . . . 106-K that are associated with respective distinct cryptocurrency systems 107-1, 107-2, . . . 107-K. For example, the distinct cryptocurrency systems 107 illustratively comprise respective blockchain-based cryptocurrency systems such as Bitcoin, Ethereum and Litecoin, although many other cryptocurrency systems can be additionally or alternatively supported in illustrative embodiments. In some contexts herein, amounts of cryptocurrency in the Bitcoin, Ethereum and Litecoin cryptocurrency systems are referred to as BTC, ETH and LTC, respectively. Cryptocurrency in some of the description herein is also referred to as "coins," although it is to be appreciated that such references do not refer to physical currency.

The sets of blockchain processing devices 106 collectively implement distributed consensus protocols for maintaining blockchains of their respective cryptocurrency systems 107. For example, different ones of the sets of blockchain processing devices 106 collectively maintain the Bitcoin, Ethereum and Litecoin blockchains. The term "blockchain" as used herein is intended to be broadly construed so as to encompass distributed ledgers and other similar arrangements that are collectively maintained by multiple processing devices performing cryptographic operations involving interrelated data blocks.

Blockchains as used in embodiments herein can therefore include, for example, "permissionless" or public blockchains such as Bitcoin, Ethereum and Litecoin in which any user can participate in building consensus for validation of blockchain transactions, as well as "permissioned" or private blockchains in which only restricted sets of users can participate in building consensus for validation of blockchain transactions.

A given blockchain in some embodiments can comprise or be otherwise associated with one or more smart contract programs. Such a smart contract program of a blockchain may itself comprise multiple separate programs.

The system 100 further comprises a plurality of servers 108-1 through 108-N, also referred to herein as servers $S_1$ through $S_N$, which communicate over the network 105 with other elements of the system 100. The servers 108 and the real-time cryptocurrency exchange platform 104 are assumed to be implemented using respective sets of one or more processing devices each comprising a processor coupled to a memory. Accordingly, the servers 108 and platform 104 are considered examples of what are more generally referred to herein as "processing devices" of system 100. Such processing devices in some embodiments are also referred to herein as "machines."

The term "processing platform" as used herein is intended to be broadly construed and illustratively comprises at least the platform 104 and possibly also at least a subset of the processing devices that implement respective ones of the servers 108.

It should be noted in this regard that one or more processing devices can each perform multiple functions within the system 100. For example, it is possible that processing devices used to implement system elements such as platform 104 and servers 108 can also perform operations relating to maintenance of the blockchains of one or more of the cryptocurrency systems 107. A given one of the sets of processing devices 106 should therefore not be viewed as necessarily including all of the processing devices that participate in maintenance of the blockchain of the corresponding cryptocurrency system.

In some embodiments, the servers 108 are eliminated from the system 100 and the system 100 provides real-time cryptocurrency exchange functionality utilizing the real-time cryptocurrency exchange platform 104 but no additional servers. An example of an embodiment of this type is described below in conjunction with FIG. 2.

In other embodiments, the servers 108 interact with the real-time cryptocurrency exchange platform 104 so as to allow those elements to collectively provide real-time cryptocurrency exchange functionality in the system 100. An example of an embodiment of this type is described below in conjunction with FIG. 11.

In still further embodiments, the real-time cryptocurrency exchange platform 104 is implemented as one of a set of N servers that collectively provide real-time cryptocurrency exchange functionality in the system 100. In such an embodiment, the servers 108 include N−1 servers rather than N servers and the real-time cryptocurrency exchange platform 104 operates as an N-th server. An example of an embodiment of this type is described below in conjunction with FIG. 15.

The real-time cryptocurrency exchange platform 104 in some embodiments therefore illustratively comprises a server such as one of the servers 108 of the system 100. Similarly, each of the servers 108 of the system 100 can incorporate functionality similar to that of the real-time cryptocurrency exchange platform 104.

The real-time cryptocurrency exchange platform 104 includes a trusted execution environment. More particularly, the real-time cryptocurrency exchange platform 104 comprises a processor 120 that includes a trusted execution environment in the form of a secure enclave 121. Each of the servers 108 is also assumed to comprise a trusted execution environment implemented as a secure enclave.

In other embodiments, it is possible that one or more of the servers 108 can be implemented without a secure enclave or other type of trusted execution environment.

The trusted execution environments of the real-time cryptocurrency exchange platform 104 and the servers 108 in the present embodiment more particularly comprise Intel SGX-based secure enclaves. SGX comprises a set of instructions that confer hardware protections on user-level code, as described in, for example, Intel Corporation, "Intel® Software Guard Extensions Programming Reference," 329298-002, US edition, 2014; "Intel® Software Guard Extensions Evaluation SDK User's Guide for Windows OS," 2015; and "Intel® Software Guard Extensions SDK," 2015. See also V. Costan et al., "Intel SGX explained," Cryptology ePrint Archive, Report 2016/086, 2016.

SGX enables process execution in a protected address space known as an enclave. The enclave protects the confidentiality and integrity of the process from certain forms of hardware attack and other software on the same host, including the operating system.

For example, an SGX-based secure enclave isolates code and data using hardware mechanisms in the CPU. Assuming the physical CPU package is not breached, SGX-based secure enclaves are protected from an attacker with physical access to the machine, including access to the memory, the system bus, BIOS, and peripherals.

An SGX arrangement of the type described above illustratively implements what are more generally referred to herein as hardware-based isolation mechanisms of a CPU or other type of processor in a given processing device.

The real-time cryptocurrency exchange platform 104 and the servers 108 of system 100 in some embodiments are each configured to execute one or more sets of process code associated with real-time cryptocurrency exchange in its corresponding trusted execution environment comprising an SGX-based secure enclave.

Such an arrangement protects the real-time cryptocurrency exchange platform 104 and the servers 108 of system 100 against malicious processes, as well as against the host operating system, and can provide attestation to a remote client that the client is interacting with a legitimate, SGX-backed instance of the process code.

During execution, enclave code and data reside in a region of protected memory called the enclave page cache (EPC). When enclave code and data is resident on-chip, it is guarded by CPU access controls; when it is flushed to DRAM or disk, it is encrypted. A memory encryption engine encrypts and decrypts cache lines in the EPC as they are written to and fetched from DRAM.

Enclave memory is also integrity-protected, ensuring that modifications and rollbacks can be detected, and the enclave can terminate execution. Only code executing inside the enclave is permitted to access the EPC. Enclave code can, however, access all memory outside the enclave directly. As enclave code is always executed in user mode, any interaction with the host OS through system calls, e.g., for network or disk I/O, must execute outside the enclave. Invocations of the enclave code can only be performed through well-defined entry points under the control of the application programmer.

In addition, SGX supports remote attestation, which enables an enclave to acquire a signed statement from the CPU that it is executing a particular enclave with a given hash of memory, known as a quote. A third-party attestation service, e.g., as provided by the Intel Attestation Service (IAS), can certify that these signed statements originate from authentic CPUs conforming to the SGX specification.

It is to be appreciated that illustrative embodiments are not limited to use of the above-described SGX-based secure enclaves. For example, the real-time cryptocurrency exchange platform 104 and servers 108 can be configured to include other types of trusted execution environments, such as an ARM TrustZone trusted execution environment. The term "trusted execution environment" as used herein is therefore intended to be broadly construed.

The real-time cryptocurrency exchange platform 104 further comprises, in addition to processor 120 and its secure enclave 121, a memory 122 and a network interface 124. The processor 120 is assumed to be operatively coupled to the memory 122 and to the network interface 124, as illustrated in the figure.

The processor 120 may comprise, for example, a microprocessor, an application-specific integrated circuit (ASIC), a field-programmable gate array (FPGA), a central processing unit (CPU), an arithmetic logic unit (ALU), a graphics processing unit (GPU), a digital signal processor (DSP), or other similar processing device component, as well as other types and arrangements of processing circuitry, in any combination.

The memory 122 stores software program code for execution by the processor 120 in implementing portions of the functionality of the processing device. For example, at least portions of the real-time cryptocurrency exchange functionality of platform 104 can be implemented using program code stored in memory 122.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with real-time cryptocurrency exchange functionality of the system 100.

The network interface 124 is configured to allow the real-time cryptocurrency exchange platform 104 to communicate over the network 105 with other system elements, and may comprise one or more conventional transceivers.

Each of the servers 108 is assumed to be similarly implemented using respective processing devices comprising processor, memory and network interfaces such as those described above in the context of the real-time cryptocurrency exchange platform 104.

As mentioned previously, some embodiments are configured to allow amounts of one cryptocurrency, such as Bitcoin, to be exchanged for amounts of other cryptocurrencies. In the Bitcoin cryptocurrency system, each user is identified by a public Bitcoin address that is associated with a public/private key pair that is kept by the user. Bitcoin users exchange funds by issuing public Bitcoin transactions, i.e. pieces of information conveying which funds are to be transferred between which Bitcoin addresses.

Bitcoin is implemented in the form of a distributed peer-to-peer network that executes a replicated state machine. Each peer, or node, in the network maintains and updates a copy of the Bitcoin blockchain, an append-only log that contains the transaction history of every account in the network. Users interact with the network by issuing transactions to transfer amounts of Bitcoin, also denoted as BTC or coins in some description herein. Valid transactions consume unspent transactions as inputs and create new unspent outputs that can later be used in a new transaction. To spend an unspent output, a condition specified by a locking script must be met. Typically, a signature matching an address proves that the user spending the output owns the account claiming the funds. More complex locking scripts can be expressed, such as m-of-n multisig transactions, where m signatures are required out of n possible signatures to spend the funds; and timelocked transactions, which can only be spent after a point in the future.

More particularly, each transaction on the Bitcoin blockchain consists of transaction inputs and transaction outputs. Transaction inputs are unspent transaction outputs (UTXOs), i.e. outputs of previous transactions that have not yet been spent. As a consequence, valid transactions consume, or spend, existing UTXOs as inputs and create new UTXOs that can later be used in new transactions. To use an UTXO as a transaction input, i.e. to spend the UTXO, the spending user must meet a condition expressed as a script that is specified within each UTXO. Typically, this script specifies that the spender must present a signature that matches a certain Bitcoin address, thus proving ownership of the UTXO (this is often termed "pay-to-public-key-hash" or P2PKH). Illustrative embodiments to be described herein utilize P2PKH scripts, but more complex scripts could be used in other embodiments. All nodes maintain a copy of the Bitcoin blockchain and verify that all issued transactions are valid, i.e., only spend UTXOs and satisfy all scripts' conditions.

Transactions are appended to the Bitcoin ledger in batches known as blocks. Each block includes a unique ID, and the ID of the preceding block, forming a chain. Peers in the network compete to generate and append these blocks to the blockchain. This process, known as mining, is computationally expensive and requires solving a cryptographic puzzle. Miners are compensated for their efforts via the block reward as well as the transaction fees collected from the transactions in that block. The Bitcoin protocol dynamically adjusts the difficulty of the cryptographic puzzle so that a block is appended to the blockchain at an average rate of one block every ten minutes. In cases in which there are multiple blocks with the same parent (forks), the network adopts the chain with the greatest difficulty.

This Bitcoin protocol architecture protects against double spend attacks. In such an attack, two conflicting transactions claim the same unspent outputs. The Bitcoin protocol will ensure that the miners will mine at most one of these transactions, and clients of the network will wait for additional succeeding blocks (typically, six blocks) to guard against forks and reorganizations.

Overall, the Bitcoin protocol suffers from two fundamental limitations. First, because it limits the size of each block and the rate of block generation, the network is fundamentally limited in throughput. Second, because the suffix of the blockchain is subject to reorganization, users typically must wait until their transactions are buried sufficiently deeply, incurring a minimum latency.

For the following description, it is assumed that the cryptocurrency systems 107 comprise respective blockchain-based cryptocurrency systems, such as the above-described Bitcoin cryptocurrency system, although as noted above other types of cryptocurrency systems can be supported.

In some embodiments, the real-time cryptocurrency exchange platform 104 is configured to release from its secure enclave 121 a first blockchain transaction on a first one of the blockchain-based cryptocurrency systems 107-1, and to condition release from its secure enclave 121 of a second blockchain transaction relating to the first blockchain transaction on receipt of at least a specified threshold amount of evidence of confirmation of the first blockchain transaction on the first blockchain-based cryptocurrency system 107-1.

As one example, the first and second blockchain transactions can collectively implement an exchange of a first amount of cryptocurrency in the first blockchain-based cryptocurrency system 107-1 for a second amount of cryptocurrency in the first blockchain-based cryptocurrency system 107-1.

A wide variety of other types of exchanges, each possibly involving cryptocurrencies of two or more distinct users, can also be supported by the real-time cryptocurrency exchange platform 104. Such exchanges can also possibly be carried out with the involvement of at least a subset of the servers 108.

As another example, the second blockchain transaction in some embodiments is on a second blockchain-based cryptocurrency system 107-2 different than the first blockchain-based cryptocurrency system 107-1. The first and second blockchain transactions in such an embodiment collectively implement an exchange of a first amount of cryptocurrency in the first blockchain-based cryptocurrency system 107-1 for a second amount of cryptocurrency in the second blockchain-based cryptocurrency system 107-2.

In some embodiments, the secure enclave 121 of the real-time cryptocurrency exchange platform 104 is more particularly configured to release the first blockchain transaction on the first blockchain-based cryptocurrency system 107-1.

Responsive to receipt of at least the specified threshold amount of evidence of confirmation of the first blockchain transaction on the first blockchain-based cryptocurrency system 107-1, the secure enclave 121 is configured to release the second blockchain transaction on the second blockchain-based cryptocurrency system 107-2.

Responsive to receipt of at least a specified threshold amount of evidence of confirmation of the second blockchain transaction on the second blockchain-based cryptocurrency system 107-2, the secure enclave 121 is configured to release first secret information generated in the secure enclave 121.

Responsive to receipt of at least a specified threshold amount of evidence of confirmation of an update of the first blockchain transaction on the first blockchain-based cryptocurrency system 107-1 with witness information satisfying a designated predicate, the secure enclave is configured to release second secret information generated in the secure enclave 121.

In some embodiments in which the real-time cryptocurrency exchange platform 104 interacts with at least a subset of the servers 108 to support secure exchanges, their secure enclaves share at least one cryptographic key. The shared cryptographic key illustratively comprises a shared symmetric secret key, or a shared secret key of a key pair ($s_k$, $p_k$). The shared cryptographic key is secured within the respective secure enclaves of the real-time cryptocurrency exchange platform 104 and the servers 108.

For example, embodiments of this type can be configured such that the real-time cryptocurrency exchange platform 104 sends to each of the servers 108 a ciphertext comprising an encryption of the first blockchain transaction, the second blockchain transaction, a cancellation transaction for the first blockchain transaction, and a cancellation transaction for the second blockchain transaction. The real-time cryptocurrency exchange platform 104 broadcasts the first blockchain transaction on the first blockchain-based cryptocurrency system 107-1 responsive to acknowledgement of receipt of the ciphertext by at least a specified threshold number of the servers 108.

The term "broadcast" in this context and other similar contexts herein is intended to be broadly construed, so as to encompass various techniques for making the blockchain transaction apparent to or otherwise accessible to the set of blockchain processing devices of the corresponding blockchain-based cryptocurrency system.

Each of the servers 108, in an embodiment of the type just described, is illustratively configured, responsive to a failure to detect confirmation of the first blockchain transaction on the first blockchain-based cryptocurrency system 107-1 within a designated number of blocks, to broadcast the cancellation transaction for the first blockchain transaction on the first blockchain-based cryptocurrency system 107-1.

Each of the servers 108 is further configured, responsive to detection of confirmation of the first blockchain transaction on the first blockchain-based cryptocurrency system 107-1, to broadcast the second blockchain transaction on the second blockchain-based cryptocurrency system 107-2.

Each of the servers 108 is still further configured, responsive to detection of confirmation of the cancellation transaction for the first blockchain transaction on the first blockchain-based cryptocurrency system 107-1, to broadcast the cancellation transaction for the second blockchain transaction on the second blockchain-based cryptocurrency system 107-2.

In other embodiments, the real-time cryptocurrency exchange platform 104 operates as a server in a set of servers that further comprises at least a subset of the servers 108. Each of the servers in such an embodiment executes a corresponding instance of a leader election protocol that under specified conditions rotates a leader designation among the servers. A given one of the servers currently designated as a leader is configured to encrypt enclave data of its corresponding secure enclave, to send the encrypted enclave data to each of the other servers, to send to each of the other servers a ciphertext comprising an encryption of the first blockchain transaction, the second blockchain transaction, a cancellation transaction for the first blockchain transaction, and a cancellation transaction for the second blockchain transaction, and to broadcast the first blockchain transaction on the first blockchain-based cryptocurrency system 107-1 responsive to acknowledgement of receipt of the ciphertext by at least a specified threshold number of the other servers.

Illustrative embodiments provide a trust-free cryptocurrency exchange where the participants can respond to price fluctuations in a rapid manner, for example, by altering their trading positions within seconds. Some embodiments are configured to accommodate utilization of automated programs for high frequency trading and arbitrage, through which traders can modify their trading positions within milliseconds.

These and other arrangements are considered to be examples of "real-time" exchanges, as the term "real-time" is broadly used herein. Accordingly, real-time exchanges in the context of the illustrative embodiments disclosed herein can encompass arrangements that would be considered "near-real-time" in other contexts.

A given real-time cryptocurrency exchange as disclosed herein is illustratively configured to enable price discovery, in that traders can observe the alterations in the buy ("bid") and sell ("ask") orders on the exchange, as well as external events, then modify their respective trading positions, and in this process the price converges so that the gap ("spread") between the bids and asks is small.

These and other embodiments avoid the systemic risk of theft of traders' funds that is inherent in most conventional centralized cryptocurrency exchanges.

Illustrative embodiments referred to herein as "Tesseract" implementations utilize Intel SGX or other trusted execution environments to provide a real-time cryptocurrency exchange in which traders' funds can never be stolen, even if a potential thief gains complete physical access to the machine in which the funds are stored. These and other embodiments also provide mitigation of denial-of-service (DOS) attacks.

The Tesseract exchange in some embodiments may be viewed as relying on a trusted party in the form of the trusted hardware manufacturer, because the asymmetric secret key that resides inside the CPU (and generates signatures for remote attestation) must be known to the manufacturer. It can be argued that a weaker yet similar form of trust is required in a practical instantiation of any cryptographic protocol, since the manufacturer may be able to attack the protocol by embedding malicious logic into the hardware.

Thus, Tesseract still requires trust, but to a significantly lesser degree than centralized cryptocurrency exchanges and other conventional approaches.

Additionally, different types of valuable assets can circulate within a single cryptocurrency system, and hence a secure exchange service can be useful even if it interacts with only one cryptocurrency, as in some embodiments herein. Since real-time response to price fluctuations can be highly important for asset trading, a variant of Tesseract (that is in fact significantly simpler) can be deployed in this case as well.

The above-noted Bitcoin, Ethereum and Litecoin cryptocurrencies are examples of cryptocurrencies that are based on proof-of-work (PoW). In such cryptocurrencies, each participant possesses machines (that perform the PoW computations) as the scarce resources that determine the participant's relative power in the consensus protocol.

However, illustrative embodiments can utilize cryptocurrency protocols based on other kinds of scarce resources. For example, in a proof-of-stake based cryptocurrency, the scarce resources are the coins that circulate in the system, and in a proof-of-space based cryptocurrency, the scarce resources are storage space.

Accordingly, although some embodiments are configured herein to support PoW-based cryptocurrencies, other cryptocurrencies can be supported in a similar manner. For example, the blocks of a PoW blockchain are typically validated by inspecting a hash digest, and the blocks of a proof-of-stake blockchain are typically validated by inspecting the UTXO set (i.e., the current unspent outputs) and verifying digital signatures. Hence, the enclave code can maintain the UTXO set and verify the needed signatures for the new blocks. In fact, if the proof-of-stake protocol requires blocks to contain a commitment to the UTXO set, then the complexity of the enclave code will be quite minimal.

It is be appreciated that the particular arrangement of components and other system elements shown in FIG. 1 is presented by way of illustrative example only, and numerous alternative embodiments are possible. For example, the configuration of real-time cryptocurrency exchange platform 104 and servers 108 can be varied in other embodiments in the manner previously described.

Additional aspects of illustrative embodiments will be described in greater detail below with reference to FIGS. 2 through 19. These embodiments include various implementations of real-time cryptocurrency exchange referred to herein as "Tesseract." The Tesseract implementations are considered illustrative embodiments, and so the particular details of these implementations as described below should not be construed as limiting in any way. Such Tesseract implementations can also be viewed as more detailed examples of particular implementations of the real-time cryptocurrency exchange arrangements of system 100 as described previously.

These illustrative embodiments are described in the context of the Bitcoin, Ethereum and Litecoin cryptocurrency systems, but as indicated previously are applicable to other types of cryptocurrencies.

Figure 2:
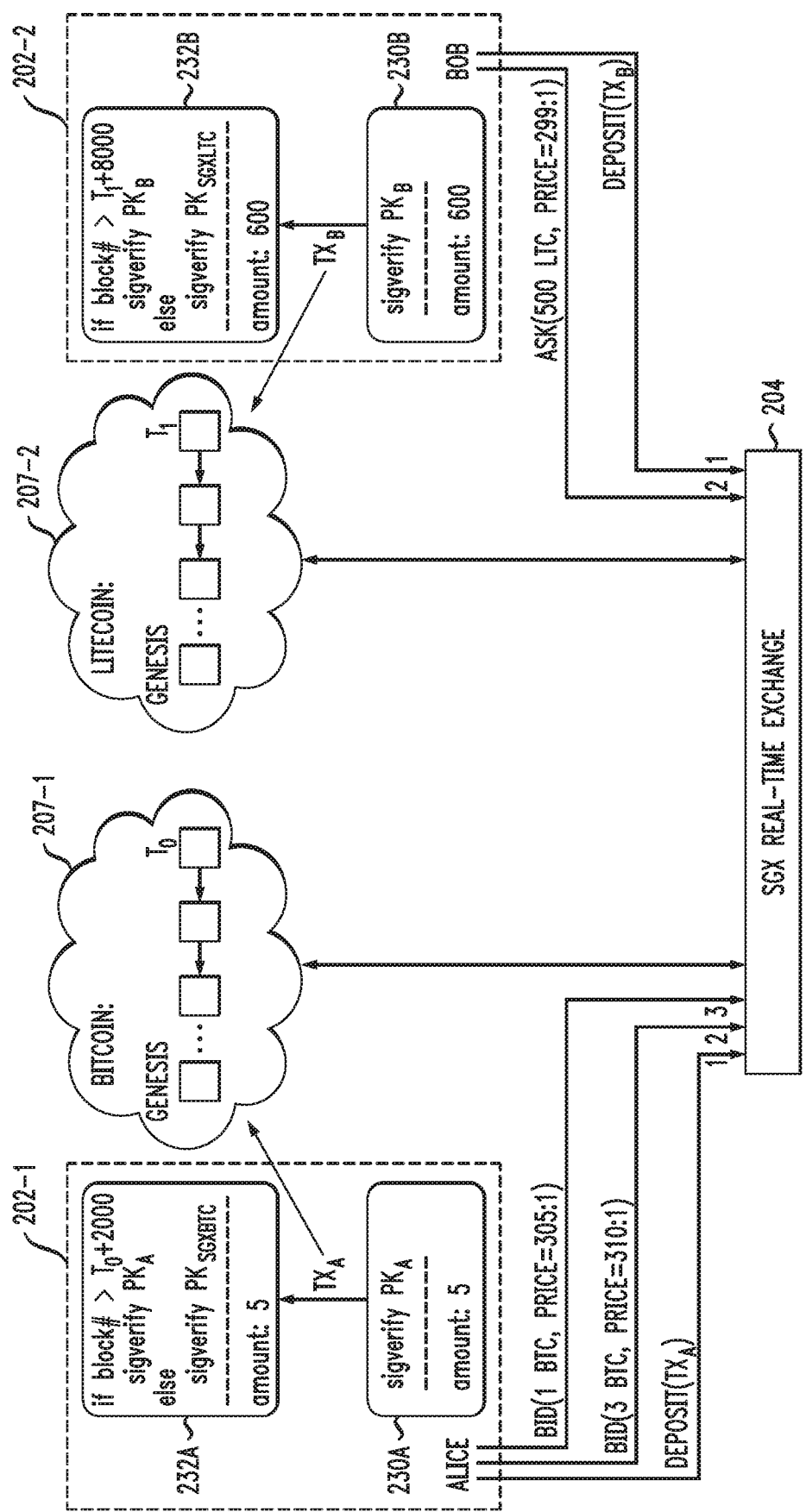
FIG. 2 shows an example of a real-time cryptocurrency exchange using trusted hardware in an illustrative embodiment.

Referring now to FIG. 2, an information processing system 200 comprises a real-time cryptocurrency exchange platform 204 that is assumed to be implemented using an SGX-based secure enclave of the type described above. The real-time cryptocurrency exchange platform 204 is therefore more particularly referred to in the context of the figure as an SGX real-time exchange. Again, other types of trusted hardware comprising different trusted execution environments can be used in other embodiments.

The SGX real-time exchange 204 interacts with first and second user devices 202-1 and 202-2 associated with respective first and second users denoted as Alice and Bob. The user devices 202 and the SGX real-time exchange 204 also interact with first and second cryptocurrency systems 207-1 and 207-2, illustratively comprising respective Bitcoin and Litecoin cryptocurrency systems having respective distinct blockchains. Each of the blockchains is characterized by a sequence of blocks from a current block to a genesis block. The current blocks in the Bitcoin and Litecoin blockchains are denoted as $T_0$ and $T_1$, respectively.

The SGX real-time exchange 204 implements a Tesseract real-time cryptocurrency exchange service. In this embodiment, the enclave code is hardcoded with the hash of the Bitcoin genesis block, or a more recent "checkpoint" block of the Bitcoin blockchain. When the execution starts, the enclave receives the latest block headers from an untrusted Bitcoin client that runs on the same server machine. Each header has its PoW validated against the difficulty rule of the Bitcoin protocol, and is then added to a first-in first-out (FIFO) queue that is stored inside the enclave. The size of the queue is set according to a parameter that specifies the maximal time window that the enclave maintains. For instance, 8064 Bitcoin block headers would correspond to a 2 month window (when header 8065 is added the first header will be removed, and so on).

The enclave will also maintain the same kind of queue for every other cryptocurrency that is supported by the Tesseract exchange service. We note that Bitcoin and Litecoin block headers are 80 bytes each, and an Ethereum block header is 512 bytes.

After initialization, the enclave invokes a key generation procedure to create a key pair $(s_k, p_k)$ for each supported cryptocurrency. The randomness that we feed to the key generator is obtained by concatenating several sources: the RDRAND instruction that sgx_read_rand( ) uses for hardware-based randomness, the hashes of the latest blockchain blocks, OS-provided randomness via/dev/random, and the SGX trusted clock. Each of these sources increases the entropy of the random data, and therefore reduces the likelihood that an adversary will have knowledge of the secret key $s_k$.

The enclave will then attest that the public key $p_k$ is its deposit address, and the attestation of $p_k$ should be published through multiple services (such as websites, IPFS, and even Bitcoin and other blockchains).

As an example, FIG. 2 shows two such deposit addresses $PK_{SGXBTC}$ and $PK_{SGXLTC}$, for Bitcoin and Litecoin, respectively. Components of illustrative embodiments configured to counter Denial-of-Service (DOS) attacks as described below are useful for making sure that the attested deposit addresses will be publicly known.

In some embodiments, the deposit address is illustratively implemented as a hash of the public key, as this increases the security and reduces the size of unspent outputs on the public ledger. For example, a 257-bit compressed ECDSA public key gives 128 bits of security at the most, while a 160-bit hash digest of the 257-bit public key will give 160 bits of security (assuming the hash function is preimage-resistant). Note that there is no point to mount a collision attack on a scriptless address. The settlement transaction to be described below will expose the public key, but potential attacks would then have a short timeframe until the transaction becomes irreversible. Hence, for maximal security the enclave will generate and attest to a fresh deposit address after each settlement.

When a new user wishes to open a Tesseract account, the user first needs to deposit a significant enough amount into a deposit address of the exchange. After the deposit transaction is confirmed on the blockchain, a graphical user interface (GUI) client of the user will transform the confirmed deposit into evidence that will be sent to the enclave. This evidence comprises the transaction that spends the coins into a deposit address of Tesseract, as well as an authentication path that comprises the sibling nodes in the Merkle tree whose root is stored in a block header (see FIG. 18), and the index of that block. The enclave will use the headers queue that it maintains to verify the validity of the deposit, and that the block that contains the deposit is buried under sufficient additional confirmations. In FIG. 2, the evidence that Alice provides is denoted Deposit($TX_A$).

As shown in FIG. 2, the output of a valid deposit transaction needs to specify a time limit (e.g., two weeks). Before the limit is reached, only the enclave can spend the deposit amount (for a Bitcoin deposit, this public key $PK_{SGXBTC}$ is hardcoded in the output and the spending is done by creating a signature with the corresponding secret key $SK_{SGXBTC}$). After the time limit, the user can gain back control of its money by signing with a secret key that only it knows. In cryptocurrencies such as Bitcoin and Litecoin, the time limit can be expressed in the output script via the CHECKLOCK-TIMEVERIFY instruction. This deposit format ensures that the funds will safely be restored to the user in the case that the Tesseract server becomes unavailable.

We note that the enclave is hardcoded with the current difficulty parameter of each PoW-based blockchain. At the beginning of the execution, the enclave will fetch blocks from genesis (or the more recent checkpoint), and verify that the chain reaches a block of the hardcoded difficulty level. This prevents an adversary (who has physical control of the Tesseract server) from feeding a low-difficulty fake chain to the enclave. The users of the Tesseract exchange can gain extra security by inspecting the latest block of each traded cryptocurrency and verifying (via remote attestation) that the enclave has the latest blocks, as described in more detail elsewhere herein.

Malicious users may try to carry out a DoS attack on the Tesseract server, by attempting to open many new accounts while providing fake deposits as evidence. Currently, Bitcoin blocks contain less than 4000 transactions, which implies that the authentication path requires 12 or less sibling nodes of the Merkle tree, and hence 12 invocations of a hash function. Thus, the time complexity of verifying the validity of a deposit is quite low. To further mitigate the prospects of a DoS attack, the enclave may require a moderate PoW done on the entire evidence data of the deposit (that the user will compute on its own), or simply limit the number of new account requests per timeframe.

One reason that the enclave maintains a queue of headers and fetches the additional block confirmations from the queue, as opposed to asking the user to concatenate the extra confirmations as part of the evidence of the deposit, is that the queue provides an undisputed point of reference in the form of the genesis (or checkpoint) block. That is to say, if there are two blockchains that use the same hash function for PoW and have a similar difficulty level, then a malicious user could deceive the enclave to accept a deposit transaction that was confirmed on an incorrect blockchain. This approach also reduces the communication complexity between the Tesseract server and remote users.

After the user registers with Tesseract, its deposited amount is credited into its account entry in an array of user information that is stored inside the enclave. Next, the user will be able to trade in real-time with other users who opened a Tesseract account, by sending bid/ask orders to the Tesseract server via a secure channel that is further described elsewhere herein. If the user wishes to deposit other currencies into its account, the user can then send similar authentication paths as evidence.

In FIG. 2, Bob opens an account with Deposit($TX_B$), and then asks to sell 500 LTC for the price of 299 LTC per BTC. Since Alice's bids are with a price of 305 LTC per BTC and higher, there is no match yet, and the requests of Alice and Bob are recorded into the order book that is kept inside the enclave. The Tesseract server publishes an anonymized version of the order book (i.e., price and volume of each order, without usernames) with remote attestation, hence anyone can observe the price spread of the exchange. Each user can request its recent trade history via the secure channel, and cancel its pending orders.

Operations performed by the user device 202-1 of Alice are denoted 230A and 232A, and include broadcasting transaction $TX_A$ to the Bitcoin blockchain as shown. Similarly, operations performed by user device 202-2 of Bob are denoted 230B and 232B, and include broadcasting transaction $TX_B$ to the Litecoin blockchain as shown. These operations illustratively comprise signature verification ("sigverify") operations using particular public keys as indicated in the figure, including the above-noted public keys $PK_{SGXBTC}$ and $PK_{SGXLTC}$, for Bitcoin and Litecoin, respectively, as well as additional public keys $PK_A$ and $PK_B$, associated with the users Alice and Bob, respectively.

More particularly, operations 230A and 230B comprise sigverify $PK_A$ and sigverify $PK_B$, respectively.

Operations 232A illustratively include the following:

```
if block# > T_0+2000
    sigverify PK_A
else
    sigverify PK_SGXBTC
```

Similarly, operations 232B include the following:

```
if block# > T_1+8000
    sigverify PK_B
else
    sigverify PK_SGXLTC
```

It is to be appreciated that the foregoing operations of FIG. 2 and other operations shown in other figures herein are presented by way of illustrative example only, and can be varied in other embodiments.

The real-time trading among the users will cause frequent updates to the balances of their accounts inside the enclave, but these updates are not yet reflected on the actual cryptocurrency systems. If nothing else were to happen, the entire process would just be a sandbox playground, as the users will simply claim their original money after the time limit of their deposits is reached. Therefore, from time to time (e.g., once a day) Tesseract will broadcast to the cryptocurrency networks "settlement" transactions that commit the current account balances of the users. See FIG. 4 for an illustration, and elsewhere herein for secure protocols for the settlements.

The user can request an early withdrawal of some of its funds. This is done by directing the enclave to prepare an output that is controlled only by the user, in the next settlement transaction. The enclave will extend the time limit of each user's output in the settlement transactions that it constructs, thereby allowing uninterrupted trading by active traders. To minimize the size of the settlement transactions, users who did not trade are not included in the inputs and outputs. When some of a user's funds are in an output whose time limit is about to expire, the user will be disallowed from trading (unless the user sends a renewal request).

In some embodiments, the Tesseract exchange is configured to collect fees for cryptocurrency exchange services. For example, it can collect a proportional fee for each successful trade (e.g., 0.1% from both ends of a trade), and a flat fee for early withdrawal and renewal requests. The exchange limits the total number of pending orders that a user may have in the order book, and users who flood the exchange with an excessive number of orders may be penalized (e.g., by confiscating some of their funds) or blacklisted for a period of time. The fees that Tesseract collects are utilized to pay miners for the settlement transactions.

In some embodiments, Tesseract utilizes Bitcoin support for aggregated Schnorr signatures to attach a single signature to the settlement transaction, instead of one signature for every input. This implies that the settlement transaction can be more than twice as small, which is significant for large transactions (e.g., with 1000 traders the transaction size will 64 kilobytes smaller). It is also likely that miners will impose a considerably lower fee for a large settlement transaction with a single aggregated signature. It should be noted that signature aggregation is required in principle if the enclave refreshes its deposit address after each settlement, since the aggregated signature will need to be verified against different public keys.

In FIGS. 17, 18 and 19 we provide example pseudocode for implementing portions of the functionality described above.

Issues relating to eclipse attacks will now be described.

Suppose that a malicious user $P_i$ succeeds in deceiving the enclave into accepting a fake Bitcoin deposit, and the account of $P_i$ inside the enclave is credited with the extra money. Suppose that $P_i$ then sends an order bid to trade the Bitcoin that it deposited for Litecoin, and an honest user $P_j$ matches that bid. The next Bitcoin settlement transaction that the enclave constructs will not be confirmed, since the Bitcoin network will regard the fake deposit input as invalid. However, the next Litecoin settlement transaction should be valid, hence $P_i$ will profit at the expense of $P_j$.

Let us assume that an adversary $\mathcal{A}$ has p fraction of the computational power of the Bitcoin network, and also has physical access to the Tesseract server. Thus, $\mathcal{A}$ can cut the communication between the enclave and the Bitcoin network, feed the enclave with dummy blocks that include its fake deposit, and wait for the enclave to construct and release the Litecoin settlement transaction.

Since $p<\frac{1}{2}$, the rate at which $\mathcal{A}$ feeds blocks to the enclave is at least twice as slow as the block arrival rate in the absence of an attack. By relying on the SGX trusted clock, the enclave can impose a rule that requires waiting for additional confirmations if the blocks arrive too slowly. We note that the Tesseract enclave is assumed to be running without interruptions, since the enclave code in some embodiments disallows rollbacks by design.

The time between every two consecutive Bitcoin blocks is an exponential random variable. Hence, for a rule that dictates whether blocks arrive too slowly we consider the sum of exponential random variables, known as the Erlang distribution. We define n to be the number of blocks that a deposit needs to be buried under, before it is credited by the enclave. We define δ as the multiplicative slowness factor by which blocks are allowed to arrive. For example, δ=3 means that blocks that arrive 3 times slower than the expected time (or more slowly than that) will trigger the enclave to wait for n extra block confirmations before accepting any deposits.

TABLE 1

Deposit Confidence vs. False Positives

| $p$ | δ | $n$ | $\Pr[\mathrm{Erlang}(n, p) \leq \delta n]$ | $\Pr[\mathrm{Erlang}(n, 1) > \delta n]$ |
|---|---|---|---|---|
| $\frac{1}{10}$ | 2 | 60 | $2^{-75}$ | $2^{-31}$ |
| $\frac{1}{10}$ | 2 | 120 | $2^{-145}$ | $2^{-58}$ |
| $\frac{1}{5}$ | 1.5 | 120 | $2^{-92}$ | $2^{-21}$ |
| $\frac{1}{4}$ | 1.3 | 120 | $2^{-82}$ | $2^{-10}$ |

Setting δ to a high value reduces the probability of a false positive (i.e., a rejected deposit when no attack is taking place and the honest chain growth was unluckily slow during some timeframe). However, a high δ also increases the prospects of an attack. For any δ>1, it is possible to set a large enough n so that the probability of a successful attack becomes negligible. However, a large n implies that honest users need to wait for a long time before their deposit is confirmed, which makes the Tesseract exchange service unattractive.

In TABLE 1 above we provide exemplary concrete parameters for n and δ. For example, the third row of TABLE 1 shows that with n=120 (which is 20 hours on average in Bitcoin) and =1.5, an adversary with p<⅕ of the computational power can mount a successful eclipse attack on the enclave with probability $2^{-92}$ or smaller, and in expectation, an honest user will need to wait for extra confirmations once in every 2 million deposits that it makes.

While the concrete parameters that can be obtained are already quite reasonable, it should be understood that that prudent users of the Tesseract exchange will not be exposed to eclipse attacks at all. Any user can simply compare the latest blocks in the actual cryptocurrency networks with the latest blocks that Tesseract enclave publishes (with remote attestation), and refuse to trade in the event of a discrepancy. In the example above, the honest $P_j$ will avoid $P_i$'s attack by observing that the latest Bitcoin blocks that Tesseract published are inconsistent with the real Bitcoin network, and refuse to trade its Litecoin for Bitcoin. Some implementations of Tesseract have another layer of security that further protects (incautious) users from eclipse attacks, as will be described below.

Secure communication can be implemented in illustrative embodiments in the following manner.

For each user who has already opened an account with Tesseract, we establish a secure channel using transport layer security (TLS) when the user wishes to communicate with the enclave. Utilizing a secure channel with authenticated encryption provides fast identification, in that the authenticated messages are computed via symmetric-key operations, after the initial key exchange (done via public-key operations) that established the channel. This form of communication is suitable for real-time trades, since symmetric-key operations are an order of magnitude faster than public-key operations. In addition, the secure channel supports prevention of frontrunning attacks in which an adversary attempts to inspect the entire communication flow that arrives at the Tesseract server, to learn information regarding real-time actions of other users, and to perform trades that would be advantageous to her. The encrypted communication of the secure channel avoids such attacks.

FIG. 3 shows an example of a frontrunning attack. In this example, Alice believes that the BTC price is going to rise. Therefore, she places an order to buy 10 BTC at $870 each, so that any of the current sellers will match her order first. On the other hand, Bob believes that the price of BTC is going to drop, and he therefore places an order to sell his 10 BTC for a price that is as low as $820. Given the public order book, Bob's intention is thus to sell 2 BTC for $850, 5 BTC for $840, and 3 BTC for $820. If the trades will be executed in this order, it will be to the benefit of Bob, because he will actually sell 10 BTC to Alice for $870 each. However, an adversary with this knowledge can permute the orders and insert new orders with its account. In this scenario, the adversary would be guaranteed to gain $10-(870-851)=$190, by buying Bob's 10 BTC for cheap and then selling it to Alice.

Since all the users send encrypted messages through their secure channels in illustrative embodiments, an adversary with a physical control of the Tesseract server cannot frontrun other users. The Tesseract exchange service, unlike conventional approaches, avoids these and other frontrunning attacks.

We note that an adversary may still observe patterns of communication at the IP-level and try to learn information about the traders. An IP-level anonymizer (e.g., Tor) is inapplicable as a mitigation technique against such adversaries, since users wish to perform real-time trades.

However, other embodiments of Tesseract can be configured to allow users to upload an algorithmic trading program to their enclave account (possibly for a fee), that will enable them to issue multiple trading orders without communication with the server. The use of automated trading programs is quite popular in centralized exchanges, but these automated traders do communicate each of their orders to the server.

Some embodiments implement double attestation functionality, as will now be described in more detail.

It may be the case that several reputable providers would offer different variants of the Tesseract service (perhaps with their own tokenized coins and fiat assets, as described below). It is therefore important to consider whether a single entity (e.g., the hardware manufacturer) has the power to compromise the security of all these different Tesseract-based platforms, simultaneously.

No such single entity exists with regard to conventional centralized exchanges, because these exchanges are independent of one another. That is to say, a security breach of one centralized exchange will not have a direct impact on the users of the other centralized exchanges. For trusted hardware with remote attestation support, one way that the manufacturer can break the security is by attesting to fraudulent data. For example, assume that there are two Tesseract-based exchanges $X_1$, $X_2$ that invite users to deposit their funds to $PK_{SGXBTC1}$ and $PK_{SGXBTC2}$, respectively. If the hardware manufacturer (e.g., Intel) has knowledge of the secret signing keys $sk_1$, $sk_2$ that are embedded into the CPUs of $X_1$ and $X_2$, then it can forge signatures that attest to fresh ephemeral public keys $PK'_{SGXBTC1}$, $PK'_{SGXBTC2}$ that the manufacturer would generate together with the corresponding secret keys $SK_{SGXBTC1}$, $SK_{SGXBTC2}$. Thus, the manufacturer will be able deceive users into sending their deposits to $PK_{SGXBTC1}$, $PK_{SGXBTC2}$, and then steal funds that users wished to deposit to $X_1$, $X_2$.

The manufacturer may also break the security by embedding malicious logic into the hardware. For instance, whenever an application executes code that generates a (supposedly) random secret key, the key will actually be generated in a way that can be predicted by the manufacturer. While this attack would be easy enough if there was one assembly opcode that generates a random key (using a randomness source with low entropy), it is far more difficult to achieve predictable behavior for any application-level code that is executed by a general-purpose CPU (as in the case of SGX and Tesseract).

Another attack vector that the hardware manufacturer may attempt is simply to send the data that a CPU generates over the network (to the manufacturer's address), without consent or knowledge of the administrator of the server computer. This is indeed a concern with Intel's Management Engine, but it is not an inherent defect of the trusted hardware model (and it is expected that the Management Engine may have an opt-out option in the future to alleviate this concern).

In some embodiments, the Tesseract platform protects against false remote attestation by attaching a secondary signature, created by an administrator of the platform, to the attested data. Following the above example, the users of $X_1$ or $X_2$ will take into consideration the reputation of the administrator of $X_1$ or $X_2$, and reject the attested data unless it was signed both by the SGX CPU and by the reputable administrator. This means that the hardware manufacturer alone cannot attack all the Tesseract-based exchanges, since the manufacturer has to collude with the administrator of an exchange in order to create a fraudulent attestation. This implies that Tesseract is strictly more secure than centralized exchanges.

The double attestation mechanism is also efficient, since the secondary signature is rarely needed. Specifically, the secondary signature is required only once for the identity public key of the enclave (which is the hardware-associated public key referred to elsewhere herein), and this identity can then establish the TLS channel with each user. All further communication in a TLS channel (e.g., bid/ask orders) is done without attestation. For non-user-specific data such as the real-time updates to the public order book, the secondary signature is already implied when HTTPS is used to view this data.

The manner in which illustrative embodiments support atomic cross-chain settlements will now be described.

Assume first that Tesseract only supports the trading of digital assets that circulate within a single cryptocurrency. In this case, the publication of each settlement transaction, which reflects the account balances of the users after trading in a time period, does not entail the risk of an adversary stealing funds from honest users. The reason is that an invalid deposit or blockage of the settlement will amount just to a DoS attack, since all the users will claim their prior funds after the time limit in the output of their original deposit (or the last settlement transaction) expires.

On the other hand, trading among multiple cryptocurrency systems (that are independent of one another) may allow the adversary to steal funds from honest users.

FIG. 4 shows an example of this type of cross-chain settlement risk. Assume that 1 BTC is worth $2000, and also that the market price of 1 BTC is 300 LTC. In the figure, Alice and Bob traded 1000 BTC (i.e., $2 million worth of BTC) for 300000 LTC (i.e., $2 million worth of LTC), while Carol and Dave traded 1 BTC for 300 LTC. Thus, the enclave will construct and sign the Bitcoin and Litecoin settlement transactions, and attempt to broadcast the settlements to the Bitcoin and Litecoin networks. An adversary with physical access to the Tesseract server can collude with Alice and intercept the Bitcoin settlement transaction when it leaves the CPU but before it is broadcasted to the Bitcoin network, and let the Litecoin settlement transaction go through and reach the Litecoin network. The result is that the transfer of ownership of $2 million worth of LTC from Bob to Alice will be committed on the Litecoin system, while the transfer of ownership of $2 million worth of BTC will never occur. In effect, Bob lost $2 million worth of funds to Alice.

Illustrative embodiments avoid this risk by providing what are referred to herein as "all-or-nothing fairness" for cross-chain settlements. More particularly, given the transaction $tx_1$ for cryptocurrency system $C_A$ and the transaction $tx_2$ for cryptocurrency system $C_B$, an all-or-nothing cross-chain settlement is illustratively defined as guaranteeing that:

1. Both $tx_1$ will become confirmed on system $C_A$ and $tx_2$ will become confirmed on system $C_B$, or
2. Neither $tx_1$ will become confirmed on system $C_A$ nor will $tx_2$ become confirmed on system $C_B$.

In our context, $C_A$ and $C_B$ are distinct cryptocurrencies. We stress that the parties that execute the consensus protocol for $C_A$ may be unaware of the existence of $C_B$, and vice versa.

Notice that the above definition of an all-or-nothing cross-chain settlement does not imply that honest users are fully protected against financial loss. Specifically, an adversary $\mathcal{A}$ that prevents both $tx_1$ and $tx_2$ from being confirmed may benefit at the expense of honest users. For example, $\mathcal{A}$ may wish to renege on a trade after observing some external events and/or price fluctuations that worked to its disadvantage. Nonetheless, the definition implies better security in comparison to conventional centralized exchanges, because the users of such centralized exchanges run not only the risk that their trades will be reversed but also the risk that their initial funds will be stolen.

An "unprivileged cross-chain settlement" is illustratively defined as follows. Let $U_1^{in}$, $U_2^{in}$ denote the sets of users in the inputs of the transactions $tx_1$, $tx_2$, and let $U_1^{out}$, $U_2^{out}$ denote the sets of users in the outputs of $tx_1$, $tx_2$. Let $U=U_1^{in} \cup U_2^{in} \cup U_1^{out} \cup U_1^{out}$. An unprivileged cross-chain settlement satisfies the previous definition of an all-or-nothing cross-chain settlement in the presence of an adversary $\mathcal{A}$ who can obtain any information that every user $P \in U$ accesses, at the moment that the information was accessed.

In essence, this definition of an unprivileged cross-chain settlement implies that honest traders cannot utilize secret data during the settlement protocol (such as picking a secret $x \in \{0,1\}^\lambda$ in an initial protocol step), because $\mathcal{A}$ could break the security by gaining access to any sensitive data that honest traders attempt to use. Thus, the definition captures a rushing adversary who has physical control over the SGX server and can intercept all the data the leaves the CPU, before honest users have an opportunity to make use of this data in a secure fashion. Notice that the definition does not permit $\mathcal{A}$ to observe the secret keys that enable honest users to spend their funds, as long as honest users do not access their secret keys during the settlement protocol.

In fact, the above definition of an unprivileged cross-chain settlement protocol gives $\mathcal{A}$ more power than a real-world adversary with physical control over the SGX server. Consider for instance a protocol where in the first step the enclave encrypts data using Carol's public key, and attempts to send the encrypted data to Carol over the network. In that case $\mathcal{A}$, will not be able to obtain the data that Carol accesses; the only action available to $\mathcal{A}$ is to mount a DoS attack and not let the protocol make progress. The motivation for the more conservative definition is that we wish to support settlement transactions among a large number of users (e.g., thousands) and multiple cryptocurrency systems, where the users can be anonymous and can create Sybil accounts. In this setting, it is difficult to design a secure protocol that sends sensitive data to rational users (with the expectation that they will act in their own self-interest), due to the possibility of malicious coalitions with Sybils who would be willing to sacrifice some of their funds. For this reason, the definition denies the enclave from having the power to communicate privately with individual users.

Thus, intricate solutions to the all-or-nothing settlement problem are utilized in some embodiments because our goal in such embodiments is to support many anonymous traders.

Figure 5:
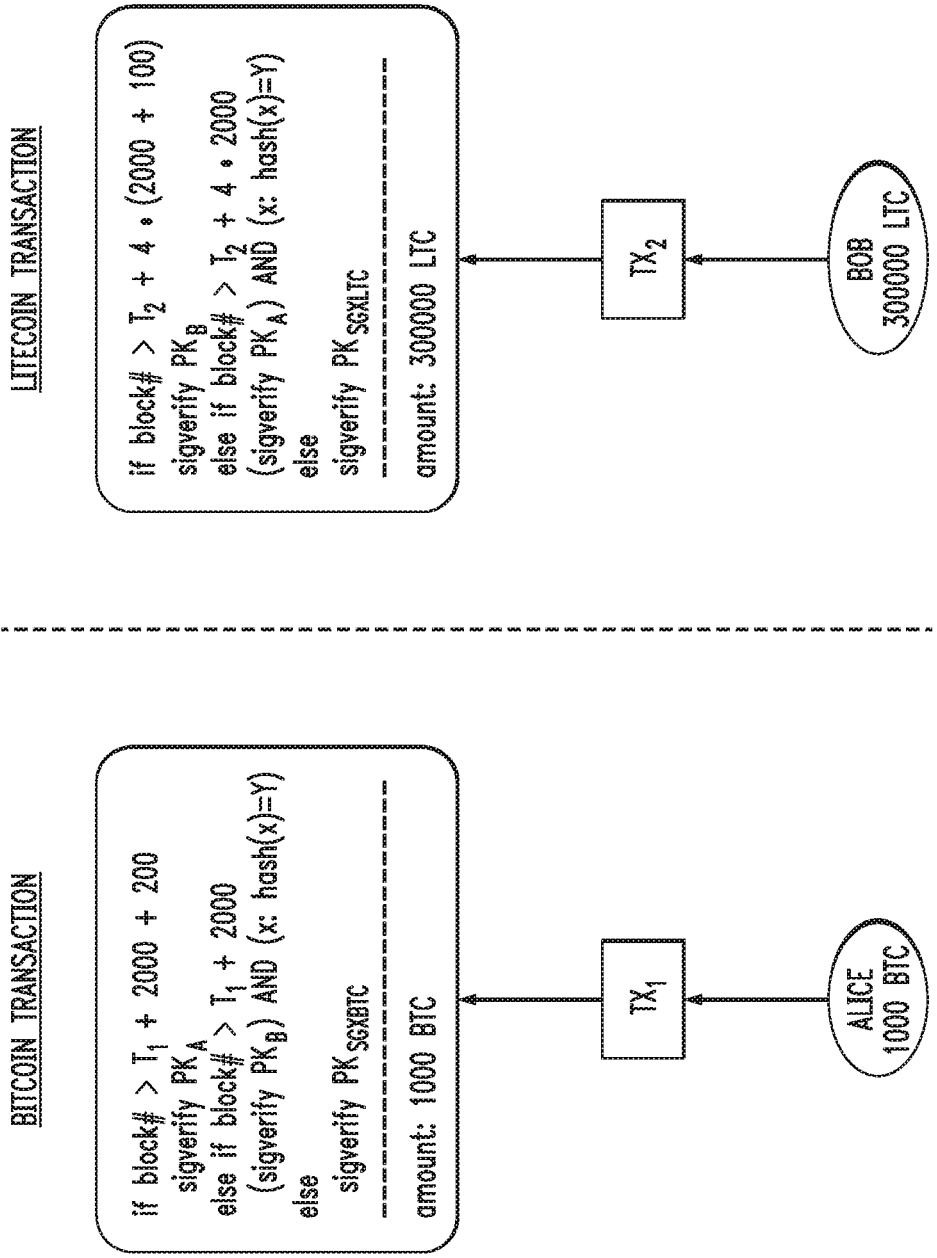
FIG. 5 illustrates settlement with two parties.

FIG. 5 shows an example of settlement with two parties which illustrates that with only a few users, the all-or-nothing settlement problem is simplified. In this example, Alice and Bob again wish to trade $2 million worth of BTC for LTC, but they are the only users of the Tesseract exchange. Here, the enclave prepares the settlement transactions $TX_1$, $TX_2$ that keep the enclave in control in the next two weeks (2000 blocks where $T_1$ is the head of the Bitcoin blockchain, and 8000 blocks where $T_2$ is the head of the Litecoin blockchain). This enables Alice and Bob to continue to trade, if they wish to. The secret data $x \in \{0,1\}^\lambda$ is generated inside the enclave. After the enclave receives evidence that $TX_1$ and $TX_2$ are both confirmed, it sends x in encrypted form only to Alice, by using a secure channel. After the two weeks, the outputs can be redeemed using x, otherwise the timeouts allow the funds to be returned to each user. The timeout in $TX_1$ is longer, so that Bob will have enough time to redeem the 1000 BTC after Alice reveals x and thereby spends the 300000 LTC.

In the FIG. 5 example, the settlement transaction $TX_1$ is associated with the following operations shown in the figure:

```
if block# > T₁ + 2000 + 200
    sigverify PK_A
else if block# > T₁ + 2000
    (sigverify PK_B) AND (x: hash(x)=Y)
else
    sigverify PK_SGXBTC
```

Similarly, the settlement transaction $TX_2$ is associated with the following operations shown in the figure:

```
if block# > T₂ + 4·(2000 + 100)
    sigverify PK_B
else if block# > T₂ + 4·2000
    (sigverify PK_A) AND (x: hash(x)=Y)
else
    sigverify PK_SGXLTC
```

In this embodiment, Y illustratively denotes a previously-computed hash commitment and x denotes a preimage of Y, such that application of the hash function to x yields Y. Although not explicitly indicated above, different x and Y values, illustratively denoted as $x_1$, $Y_1$ and $x_2$, $Y_2$, are assumed to be associated with the two different settlement transactions.

Again, these particular operations of FIG. 5 and other illustrative operations shown in figures herein are presented by way of illustrative example only, and can be varied in other embodiments.

The previous definition of an unprivileged cross-chain settlement does not give $\mathcal{A}$ the power to observe secret information that is inside the enclave. In some Tesseract implementations, this is justified because we use a constant-time constant-memory library for the cryptographic operations, hence the potential for side-channel attacks is greatly reduced.

We now present solutions to the all-or-nothing settlement problem, in a setting that involves many anonymous traders.

FIG. 6 shows a simple protocol $\Pi_{simp}$ that relies on N extra servers $S_1, S_2, \ldots, S_N$ that are supposedly reputable. The cryptocurrency systems $C_1$ and $C_2$ can be for example Bitcoin and Litecoin as in FIG. 4. The embedding of K into $TX_1$ and $TX_2$ can be done with an OP_RETURN script instruction, that allows storing arbitrary data on the blockchain as an unspendable output (for a small fee). It is not possible to mount a malleability attack that removes K from $TX_1$ or $TX_2$, because the signatures for $TX_1$ and $TX_2$ are done on the entire transaction data (i.e., data that includes the OP_RETURN output).

Since information that is published on a blockchain becomes publicly available, the idea behind $\Pi_{simp}$ is that any non-corrupt server $S_i$ will be able to impose fairness by fetching K from a public blockchain and decrypting the ciphertext ct, because ct is already in $S_i$'s possession.

Unfortunately, $\Pi_{simp}$ is insecure, due to a race condition. The adversary $\mathcal{A}$ can intercept both $TX_1$ and $TX_2$, but broadcast neither of them initially. Since the users' outputs must have a time limit, $\mathcal{A}$ will wait until an input (that belongs to a corrupt user $P_j$) in $TX_1$ is about to expire and then broadcast $TX_{3-i}$. Then $\mathcal{A}$ will instruct the corrupt user $P_j$ to spend that input, thereby $\mathcal{A}$ invalidating $TX_{3-i}$. Hence, even if all of the servers $S_1, S_2, \ldots, S_N$ are honest, they may not have enough time to fetch K from $TX_{3-i}$ and broadcast their decrypted $TX_i$.

If the cryptocurrency systems $C_1, C_2$ allow transactions to embed large arbitrary data, then it would have also been possible to eliminate the reliance on $S_1, S_2, \ldots, S_N$. Briefly, each $TX_i$ will embed the $TX_{3-i}$ data in a designated output, the enclave will broadcast both $TX_1$ and $TX_2$, and any user would then have the opportunity to enforce fairness. This would bloat $C_i$ with the entire $TX_3$ data, which is undesirable in that there are risks associated with a popular decentralized cryptocurrency that allows embedding of large data (e.g., illegal content). In any event, this approach is insecure due to the same race condition that $\Pi_{simp}$ exhibits.

A theoretical solution that avoids the above-described race condition is described herein with reference to FIGS. 7 through 10. These embodiments condition the second settlement transaction $TX_2$ on the result of the first settlement transaction $TX_1$, by constraining $TX_2$ with PoW-based predicates that verify whether certain events occurred on another blockchain.

As will be described below, this approach is problematic with the current Bitcoin protocol. Thus, we first describe the settlement protocol in a hybrid world that has an ideal "refundable multi-input transaction" (RMIT) functionality, defined in FIG. 7.

Figure 8:
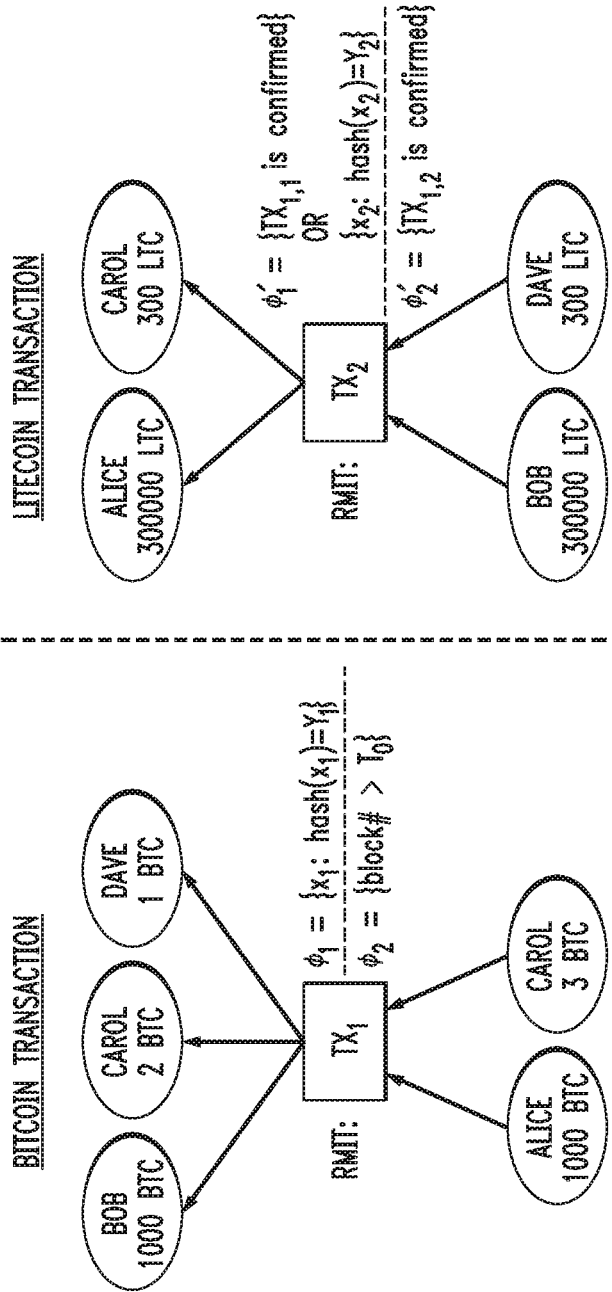
FIG. 8 shows examples of fair settlement transactions.

The description of the transactions $TX_1$, $TX_2$ is outlined in FIG. 8. We use the notation $TX_{i,j}$ to denote that $TX_i$ was updated by supplying an input witness w that satisfies a predicate $\phi_j$. The secrets $x_1 \in \{0,1\}^\lambda$, $x_2 \in \{0,1\}$ are generated inside the enclave. The predicates $\phi'_1, \phi'_2$ are specified in FIG. 9. To elaborate, a hardcoded parameter $D_0$ specifies a difficulty level for PoW mining, $\ell_1$ is an upper bound on the length of an authentication path of a Merkle tree, and $\ell_2$ is a PoW confidence parameter. The input witness w for $\phi'_1$ comprises up to $\ell_1$ sibling hash values $v_j$ for the authentication path (with direction $d_j\{\text{'L','R'}\}$), together with exactly $\ell_2$ header values. The predicate $\phi'_1$ will verify that $TX_{1,1}$ is in a leaf that reaches some root value r, and that r is extended by valid proofs of work $H_1, H_2, \ldots, H_{\ell_2}$ that meet the difficulty level Do. The input witness w for $\phi'_2$ does the same, but also verifies that there is a chain of at least $\ell_3$ blocks between the hardcoded $b_1$ and $TX_{1,2}$.

Figure 10:
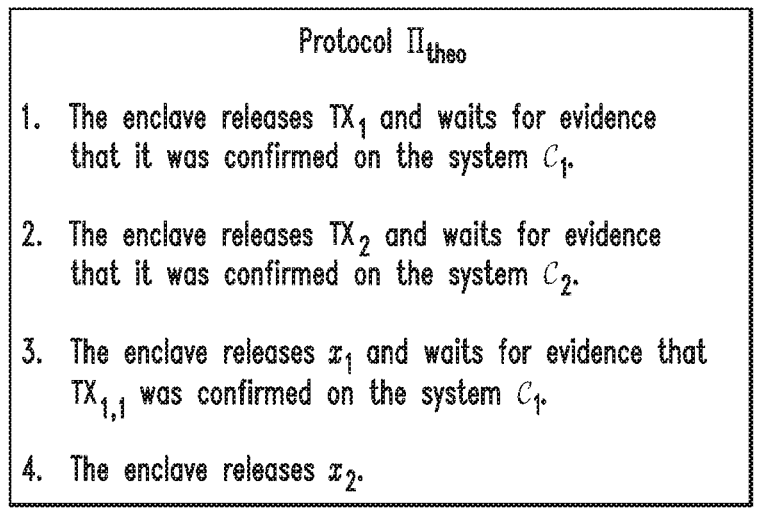
FIG. 10 is a protocol diagram showing a second example protocol for fair settlement in an illustrative embodiment.

FIG. 10 illustrates the theoretical protocol $\Pi_{theo}$ for all-or-nothing settlement. Note that the enclave constructs $TX_2$ only after it receives the evidence that $TX_1$ was confirmed in the end of Step 1, by hardcoding $b_1$ as the hash of the block in which $TX_1$ resides.

Essentially, $\Pi_{theo}$ avoids the race condition by first making sure that $TX_1$ was resolved on the cryptocurrency system $C_1$ either by committing the output or by committing the inputs, and then allowing $TX_2$ to commit accordingly in the cryptocurrency system $C_2$. If $\mathcal{A}$ carries out a DoS attack before $x_1$ is released in Step 3, then the users will gain possession of their inputs in $C_1$ after block $T_0$ is reached (see FIG. 8), which would be followed by the miners of $C_1$ helping to create a witness w that satisfies $\phi'_1(w)=1$ and thus allowing the users to gain possession of their inputs in $C_2$. If the enclave exposes $x_1$ in Step 3, then it is still the case that the miners of $C_1$ will help to resolve $TX_1$ in one of the two possible ways noted above.

In the case that no attack is taking place, the enclave will release $x_2$ in Step 4, thereby allowing the settlement to complete quickly and without asking the miners of $C_2$ to evaluate a complex condition that relates to another blockchain.

However, the assumption regarding the computational power of $\mathcal{A}$ has to be slightly less conservative in comparison to the power that is needed to mount a classical double-spending attack, because $\Pi_{theo}$ enables $\mathcal{A}$ to gain a minor head start that depends on the parameter $T_0$. Specifically, $\mathcal{A}$ can intercept $x_1$ in Step 3 and use its own computational power (and $x_1$) to create a hidden chain $w_1$ that spends $TX_1$ into $TX_{1,1}$. The miners of $C_1$ will create the witness $w_2$ in which $TX_1$ is spent into $TX_{1,2}$, but they will only begin to work on $w_2$ after block $T_0$ is reached.

TABLE 2

Breaking the Security of $\Pi_{theo}$

| p | $T_1$ | $\ell_2$ | with head start | with $T_1 = 0$ |
|---|---|---|---|---|
| $\frac{1}{3}$ | 6 | 50 | 0.0016 | 0.0003 |
| $\frac{1}{5}$ | 10 | 50 | $2^{-30}$ | $2^{-37}$ |

TABLE 2-continued

Breaking the Security of $\Pi_{theo}$

| $p$ | $T_1$ | $\ell_2$ | with head start | with $T_1 = 0$ |
|---|---|---|---|---|
| $\frac{1}{5}$ | 6 | 50 | $2^{-33}$ | $2^{-37}$ |
| $\frac{1}{5}$ | 6 | 100 | $2^{-65}$ | $2^{-69}$ |
| $\frac{1}{10}$ | 20 | 50 | $2^{-64}$ | $2^{-79}$ |
| $\frac{1}{10}$ | 10 | 50 | $2^{-71}$ | $2^{-79}$ |
| $\frac{1}{10}$ | 10 | 100 | $2^{-145}$ | $2^{-153}$ |

The success probability of an attack with a duration of $T_1$ blocks for the head start is $$\sum_{k=0}^{\infty} (Pr[NegBin(T_1, p) = k] \cdot Pr[NegBin(\ell_2, p) \geq \ell_2 - k]).$$

The first negative binomial variable counts the number of blocks that $\mathcal{A}$ creates during the time that the honest miners are creating $T_1$ blocks. This corresponds to the head start, because these $T_1$ blocks will not contribute to the witness that the predicate $\phi'_2$ requires. The second negative binomial variable counts the number of blocks that $\mathcal{A}$ creates while the honest miners are creating $\ell_2$ blocks. If $\mathcal{A}$ can extend its head start to reach $\ell_2$ or more blocks before the honest miners, then the attack succeeds.

In TABLE 2, we give exemplary values for the attack on $\Pi_{theo}$. For easy comparison, we also include the success probability without a head start (i.e., $T_1=0$), which is simply the probability $Pr[NegBin(\ell_2, p) \geq \ell_2]$.

For the opposite attack, $\mathcal{A}$ may intercept $x_1$ in Step 3 and then create a hidden chain $w_2$ that excludes $x_1$. With this attack strategy, $\mathcal{A}$ will broadcast $x_1$ to $C_1$ right before the timeout $T_0$ is reached, in hope that the hidden chain $w_2$ will outcompete the chain that the miners of $C_1$ begin to create. This attack vector is mitigated by disallowing a precomputation of $w_2$. Specifically, the enclave hardcodes $b_1$ into $TX_2$ and the predicate $\phi'_2$ verifies that $b_1$ is buried under at least $\ell_3$ PoW blocks.

The parameter $\ell_3$ should be set to $2\ell_2+T_1$. This gives a time span of $T_1$ blocks to update $TX_1$ into $TX_{1,1}$, after the enclave received the evidence that $TX_1, TX_2$ were confirmed and thus revealed $x_1$. The parameter $T_1$ should not be too low, to avoid the cancellation of the settlements in case of a short network outage or a slow chain growth in $C_2$ relative to $C_1$.

In the current Bitcoin network, $\ell_1=12$ suffices, hence the predicates $\phi'_1, \phi'_2$ require $\leq 12+\ell_2+\ell_3$ hash invocations for confidence level $\ell_2$. Given that the complexity of ECDSA signature verification is an order of magnitude higher than that of invoking a hash function, moderate values such as $\ell_2=50$, $T_1=10$, $\ell_3=2\ell_2+T_1=110$ imply that Bitcoin miners can validate the scripts $\phi'_1, \phi'_2$ for a reasonable fee.

It is unlikely that $\Pi_{theo}$ will be vulnerable to an attack that embeds a transaction that spends $TX_1$ into $TX_{1,1}$ or $TX_{1,2}$ in another cryptocurrency system $C_3$, where $C_3$ has the same PoW hash function and the same difficulty level. The reason is that the txid hash of $TX_1$ in the leaf of the Merkle tree is determined according to the prior history that goes back to the genesis block of the cryptocurrency system $C_1$. Unless $C_3$ allows the input of a transaction to comprise arbitrary data, $\mathcal{A}$ will need to mount a preimage attack that creates valid transaction in $C_3$ with a particular value (i.e., the txid of $TX_1$) as its hash.

The main obstacle to an implementation of $\Pi_{theo}$ in Bitcoin is the RMIT functionality defined in FIG. 7. It is possible to implement the specific RMIT that $\Pi_{theo}$ requires by creating a transaction $tx_{init}$ that spends the inputs into a single output that is controlled by the secret signing key of Tesseract, and creating a refund transaction $tx_{refund}$ that has locktime=$T_0$ and spends the output of $tx_{init}$ back into the inputs. After the enclave receives evidence that $tx_{refund}$ is publicly available, it will broadcast $tx_{init}$ to the Bitcoin network. When the execution of $\Pi_{theo}$ reaches Step 3 and the enclave needs to release $x_1$, it will broadcast a transaction $tx_{commit}$ that spends the output of $tx_{init}$ into the desired outputs.

A possible problem with this procedure is that there may be no acceptable way to make $tx_{refund}$ publicly available while relying on the security of Bitcoin alone. In a purely theoretical sense, it is possible to make $tx_{refund}$ available by storing it as arbitrary data on the Bitcoin blockchain using OP_RETURN, but this will be very costly because the size of $tx_{refund}$ can be dozens of kilobytes and the capacity of an OP_RETURN output is only 80 bytes. An efficient version of RMIT can be done via a Bitcoin protocol fork, in which an initial transaction will mark both the inputs and the new outputs as unspendable in the UTXO set, and a subsequent transaction will supply a witness to $\phi_1$ or $\phi_2$ and thereby ask the miners to make either the inputs or the outputs spendable (for a fee). An Ethereum implementation of a RMIT contract is possible, but it should be noted that $\Pi_{theo}$ (and its generalization to more than two systems) requires RMIT support by all the cryptocurrency systems that are involved in the settlement.

The example protocol $\Pi_{theo}$ of FIG. 10 is resilient against an adversary who has total physical control over the SGX-enabled machine. We will now describe in conjunction with FIGS. 11 and 12 a practical protocol $\Pi_{prac}$ for the all-or-nothing settlement problem that relaxes this resiliency aspect, but in fact offers better security in other respects.

Figure 11:
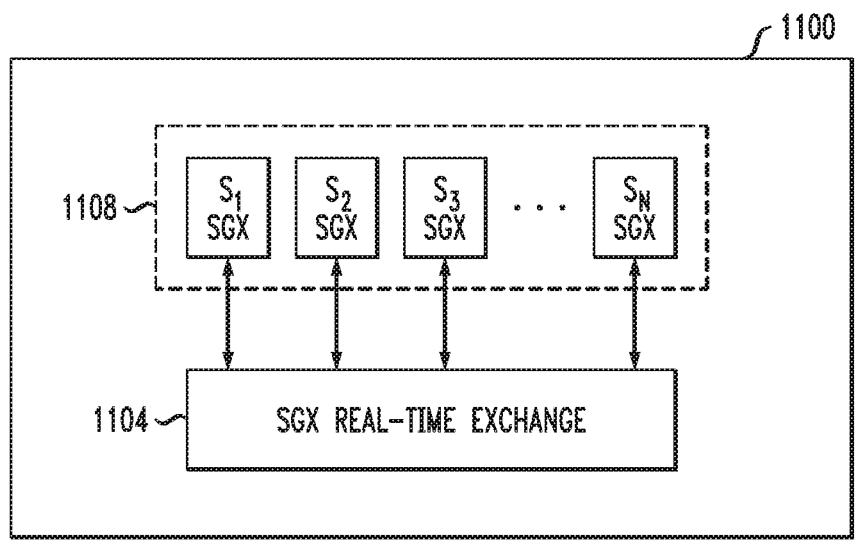
FIG. 11 is a block diagram of a processing platform comprising a first processing device that interacts with a plurality of additional processing devices implementing respective servers in an illustrative embodiment.

FIG. 11 illustrates an information processing system 1100 comprising an SGX real-time exchange 1104 similar to the real-time cryptocurrency exchange platform 104 but with trust being distributed among N additional servers 1108 that are all running SGX enclaves. Moreover, the protocol $\Pi_{prac}$ is configured to satisfy the above definition of unprivileged cross-chain settlement if there exists at least one server $S_i \in \{S_1, S_2, S_N\}$ that is beyond the physical reach of the adversary $\mathcal{A}$. That is to say, we assume that $S_1$ can communicate with the cryptocurrency systems $C_1, C_2$ without interference.

The main idea of $\Pi_{prac}$ is to emulate the essential characteristic of the theoretical protocol $\Pi_{theo}$, which is to wait for a proof that the settlement transaction $TX_1$ was either committed to $C_1$ or cancelled, and then do the same for the settlement transaction $TX_2$.

The settlement protocol $\Pi_{prac}$ that Tesseract and the servers $S_1, S_2, S_N$ execute is specified in FIG. 12. As a prerequisite, the Tesseract server and $S_1, S_2, S_N$ need to share a symmetric secret key K that is known only to their enclaves. The transactions $TX_1^c$, $TX_2^c$ are "cancellation" transactions that invalidate the settlement transactions $TX_1$, $TX_2$, respectively. In Bitcoin, $TX_1$ can be implemented simply by spending one of the inputs of $TX_1$ into a new output that is identical to that input (this will cause $TX_i$, $TX_i^c$ to conflict with each other).

Thus, the protocol $\Pi_{prac}$ seeks to preserve the property that $TX_2$ remains confidential inside the enclaves for as long as $TX_1$ is not yet confirmed. This property avoids the risk that $TX_i$, $TX_{3-i}^c$ will compete for confirmations at the same time, as that can easily violate the all-or-nothing requirement.

In the case that at least one server $S_i$ is not under physical attack, we have that either $TX_1$ or $TX_1^c$ will be broadcasted to $C_1$ within $T_1$ blocks. As a consequence, either $TX_1$ or $TX_1^c$ will be confirmed after $T_1 + \ell_2$ blocks. This would allow $S_1$ or one of the other non-adversarial servers to broadcast the appropriate transaction (i.e., $TX_2$ or $TX_2^c$) to the cryptocurrency system $C_2$, causing it to be confirmed too.

The adversary $\mathcal{A}$ may attempt to mount a race attack with a head start of $T_1$ blocks, by eclipsing one of the servers $S_j$. The attack can proceed as follows:
1. $\mathcal{A}$ will intercept the data $TX_1$ that Tesseract reveals in Step 3 of $\Pi_{prac}$, and deactivate the Tesseract server.
2. $\mathcal{A}$ will eclipse the server $S_j$, and feed it with a fake blockchain (generated by $\mathcal{A}$ itself) that contains $TX_1$.
3. When the enclave of $S_j$ becomes convinced that $TX_1$ was confirmed, it will release $TX_2$.
4. $\mathcal{A}$ will wait until $TX_1^c$ is confirmed on $C_1$, and then broadcast $TX_2$ to $C_2$.

As described previously, the reason that $\mathcal{A}$ obtains a head start is that the honest participants wait for a duration of $T_1$ blocks before they attempt to invalidate $TX_1$, whereas $\mathcal{A}$ begins to create its fake chain immediately. Note that the purpose of the cancellation transaction $TX_2^c$ is to defeat this race attack, in the case that $\mathcal{A}$ fails to generate $\ell_2$ blocks while the honest network generates $T_1 + \ell_2$ blocks.

In fact, it is more difficult for $\mathcal{A}$ to exploit the head start and attack $\Pi_{prac}$, than it is to attack $\Pi_{theo}$. This is because $\Pi_{prac}$ can specify the precise duration $T_1$, and $\Pi_{theo}$ has to estimate $T_1$ by setting $T_0$ in the predicate $\phi_2$. This estimation should use a lenient bound (that will likely give $\mathcal{A}$ a larger head start), as otherwise the variance of the block generation process can cause $\phi_2$ to be triggered and thus abort the settlement.

Notice that $\mathcal{A}$ cannot mount an eclipse attack before Step 3 of $\Pi_{prac}$ is reached. The reason is that only the Tesseract enclave can produce the data $TX_1$, and it will do so only after receiving all the acknowledgements from $S_1, S_2, S_N$ in Step 2. Therefore, an eclipse attack will be thwarted if at least one non-adversarial server $S_i \in \{S_1, S_2, \ldots, S_N\}$ is present, because $S_i$ will broadcast the invalidation transactions $TX_1^c$, $TX_2^c$ to ensure the all-or-nothing guarantee of the above definition of all-or-nothing settlement.

In practice, it is preferable that the Tesseract enclave will wait for acknowledgements from only a constant fraction of the servers $S_i \in \{S_1, S_2, \ldots, S_N\}$, so that $\mathcal{A}$ will not be able to deny service by preventing a single acknowledgement from reaching Tesseract in Step 2 of the settlement procedure. Other embodiments described below can in fact make Tesseract resistant to DoS attacks in a broader sense.

Another advantage of $\Pi_{prac}$ is that it can support other cryptocurrency systems besides those based on PoW blockchains. This is because the servers $S_1, S_2, S_N$ can run a full node inside their respective enclaves, whereas the predicates $\phi'_1, \phi'_2$, lack the power to express the irreversibility condition of a more complex cryptocurrency system.

Irrespective of the settlement procedure, the Tesseract exchange server can fetch from the servers $S_1, S_2, S_N$ the heights of their longest chains (e.g., once every 30 minutes), and refuse to confirm users' deposits if less than N/2 of the servers respond. This would avert fake deposits from being confirmed due to an eclipse attack, without relying on the prudence of the users.

Some embodiments are configured under an assumption of one secure processor, as will now be described with reference to FIG. 13.

A given such embodiment provides a workable protocol for all-or-nothing settlement that utilizes servers $S_1$, $S_2, \ldots, S_N$, that do not have SGX processors, where the protocol is secure if at least one of the servers is isolated from the adversary. The round complexity in such an embodiment illustratively depends on a security parameter.

This embodiment utilizes a gradual release technique to reveal $TX_1$, $TX_2$ simultaneously. The Tesseract enclave can generate a fresh symmetric key $K \in \{0,1\}$, send the ciphertext $ct = encrypt_K(TX_1, TX_2)$ to $S_1, S_2, \ldots, S_N$, and wait for acknowledgements from $S_1, S_2 \ldots, S_N$ that they received ct. Then, Tesseract can send each of the $\lambda$ bits of K, and wait for acknowledgements from $S_1, S_2 \ldots, S_N$ after each bit is received. Conventional aspects of gradual release techniques are described in, for example, D. Beaver and S. Goldwasser, "Multiparty computation with faulty majority," in 30th Annual Symposium on Foundations of Computer Science (FOCS), 1989, and S. Goldwasser and L. Levin, "Fair computation of general functions in presence of immoral majority," in Alfred J. Menezes and Scott A. Vanstone, editors, Proceedings of Advances in Cryptology (CRYPTO '90), volume 537 of Springer LNCS, pages 77-93, Berlin, Germany, August 1991, which are incorporated by reference herein. Other types of gradual release techniques can be used in other embodiments.

In some embodiments, we let the SGX enclave assume the role of a trusted dealer, and combine a fair secret sharing protocol with the gradual release technique. For example, we employ a fair secret reconstruction protocol, illustratively that described in Hung-Yu Lin and Lein Ham, "Fair reconstruction of a secret," Information Processing Letters, 55(1):45-47, 7 Jul. 1995, which is incorporated by reference herein. Other fair secret reconstruction protocols can be used in other embodiments.

The combined protocol $\Pi_{grad}$ is parameterized according to a decoys amount $d \geq 2$, batching value $m \geq 1$, and a timeout r (for example r=10 minutes). FIG. 13 shows the full description of the protocol $\Pi_{grad}$.

The adversary $\mathcal{A}$ can recognize whether a potential secret key K' is equal to K, by attempting to decrypt the structured ciphertext ct. Thus, if $\mathcal{A}$ can brute-force the unrevealed bits of K, it does not need to let Step 6 of $\Pi_{grad}$ progress until an indicator value $\Sigma_{j=1}^N x_i^{\alpha+1,j} = 0$ becomes known. The adversary $\mathcal{A}$ may try to guess $\alpha$ and learn an m-bit value of $\Sigma_{j=1}^N x_i^{\alpha+1,j} \neq 0$ that the honest servers do not know, but the success probability of guessing $\alpha$ correctly is $$\frac{1}{d-1}.$$

Furthermore, under the assumption that $\mathcal{A}$ cannot break K within r time in order to verify whether its guess was correct, it must execute Step 6 honestly if it would like the other servers to help to reveal the next bits of K. Note that this is the case even if $\mathcal{A}$ corrupts N−1 of the servers.

Therefore, $\Pi_{grad}$ is more secure when the timeout parameter r is smaller, when the amount of dummy secrets d is larger, and when the batching size m is smaller. In particular, if m=λ then $\Pi_{grad}$ is completely insecure: $\mathcal{A}$ will be able to corrupt the last server $S_N$ and verify for each $\ell$ whether $\Sigma_{j=1}^{N} x_1^{\ell,N} = K$, without revealing $x_1^{\ell,N}$ to the other servers.

If m=1 and d≥2 then $\Pi_{grad}$ is strictly more secure than the basic gradual release protocol. Another advantage over the basic protocol is that $\Pi_{grad}$ requires only one round of communication between Tesseract and the servers $S_1$, $S_2, \ldots, S_N$. However, the number of rounds of communication among $S_1, S_2, \ldots, S_N$ themselves is $$\Omega\left(\frac{\lambda}{m} \cdot d\right),$$

hence larger d or smaller m make $\Pi_{grad}$ less efficient.

A possible disadvantage of $\Pi_{grad}$ is that the computational power of $\mathcal{A}$ must not be significantly greater than that of the honest servers. By contrast, $\Pi_{prac}$ does not require such an assumption.

Illustrative embodiments providing fungible tokenized coins will now be described with reference to FIG. 14.

Some implementations of the Tesseract platform are configured to allow its users to withdraw and circulate tokenized coins that are pegged to some specific cryptocurrency, with no need to trust a human element and no exposure to market fluctuations. This is illustratively done by maintaining a reserve of the pegged cryptocurrency within the SGX enclave, and employing an all-or-nothing fairness protocol to ensure that the enclave remains solvent. Thus, for example, Carol can deposit 600 LTC to the Tesseract exchange, trade the 600 LTC for 2 BTC, and withdraw 2 tokenized BTC (tBTC) into the Ethereum blockchain. Then, Carol could deposit her 2 tBTC to any smart contract that recognizes the assets that Tesseract issues. For instance, Carol may wish to play a trust-free poker game in which the pot is denominated in tBTC instead of ETH, as it is impractical to play poker directly on the Bitcoin blockchain, and Ethereum's stateful contracts are utilized instead.

Figure 14:
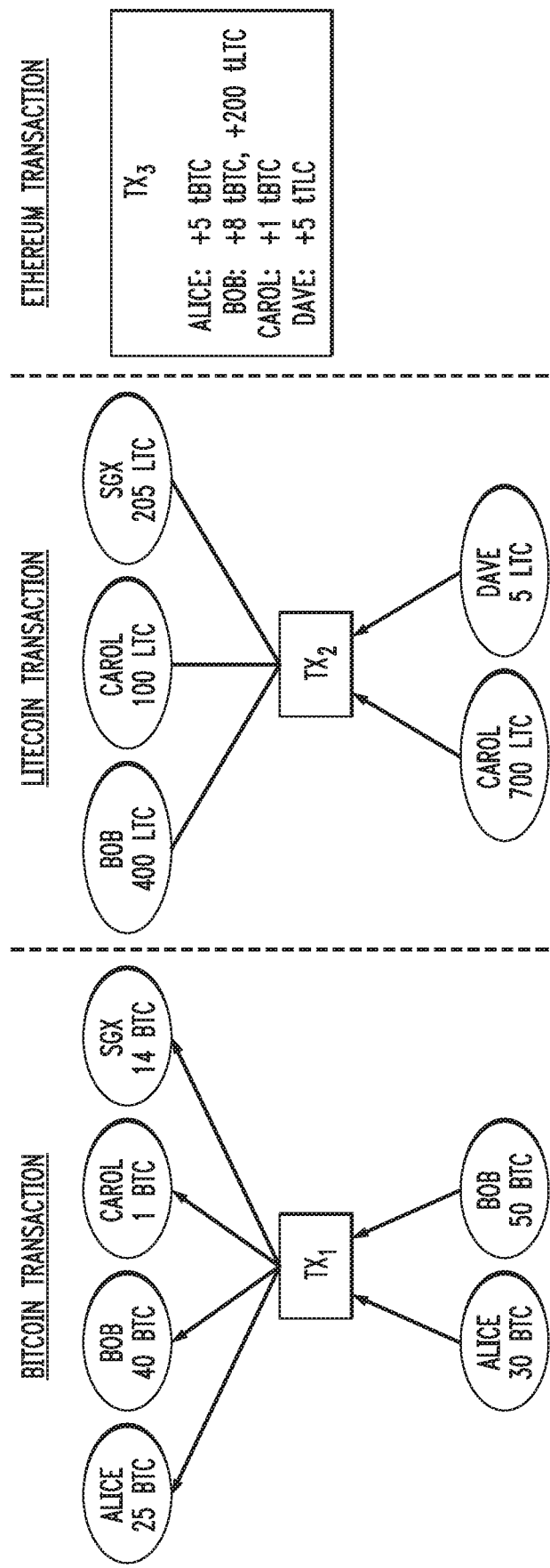
FIG. 14 shows an example of atomic issuance of tokenized cryptocurrency coins in an illustrative embodiment.

FIG. 14 shows an example of atomic issuance of tokenized coins. When a user requests to withdraw tokenized coins, the enclave will move the coins to a reserve address, and mint the same amount of new tokens (e.g., using an ERC20 smart contract, as will be described below). In this example, Alice withdraws 5 tBTC out of her 30 BTC, Bob trades 2 BTC in exchange for Carol's 600 LTC, Bob withdraws 8 tBTC and 200 tLTC, Carol keeps 1 BTC and withdraws 1 tBTC, and Dave uses all of his 5 LTC to withdraw 5 tLTC.

The enclave updates its reserve outputs (14 BTC and 205 LTC in the figure) by adding coin amounts that match the amounts of tokenized coins that the users withdrew. Unlike the native coin deposits, reserve outputs and the tokenized coins are not constrained by a timeout, and therefore the tokenized coins are fungible. Any holder of tokenized coins (e.g., tBTC) can later deposit the tokens into the enclave (the holder can create an account on the Tesseract exchange if the holder does not have one yet), and receive native coins (e.g., BTC) upon doing so. The enclave will simply discard the tokenized coins that were deposited. Hence, the tokenized coins can circulate freely on the blockchain in which they are issued (the Ethereum blockchain in the present example), without the involvement of the Tesseract exchange. For the exchange to remain solvent, we must guarantee all-or-nothing fairness with respect to the definition set forth previously for the transaction that moves native coins (from the users to the reserve output) and the transaction that mints tokenized coins. For example, in the context of FIG. 14, if $TX_1$ is not committed to the Bitcoin blockchain but $TX_3$ is committed to the Ethereum blockchain, then the eventual holders of the 14 tBTC will not be able to deposit their tokens in order to convert them to native BTC, because the reserve output (of 14 BTC) does not exist. Likewise, if $TX_3$ is not committed to the Ethereum blockchain but $TX_1$ is committed to the Bitcoin blockchain, then the Bitcoin holders will be damaged (e.g., Alice will lose 5 BTC).

As described previously, the all-or-nothing settlement should occur after an interval that is longer than the time that it takes for the all-or-nothing protocol execution to complete (e.g., an interval of 24 hours can be used). This means that when a user requests to withdraw tokenized coins, there will be a waiting period (say, somewhere between 1 hour and 25 hours) before the user receives the tokens. This also implies good scalability, since all the native coins (that are kept in reserve) are accumulated into a single output that is updated on-chain only after a lengthy time interval.

In some embodiments, the tokenized coins are issued on the Ethereum blockchain in the form of an ERC20 smart contract. It is also possible to mint the tokenized coins as colored coins on the Bitcoin blockchain, though such an arrangement can be problematic, in that tagging-based colored coins have not been implemented yet in cryptocurrencies such as Bitcoin and Litecoin, and more importantly, the principal reason for having tokenized coins is to use them in smart contracts, and Ethereum is better suited for this purpose.

Since the tokenized coins are issued by the Tesseract exchange and are fungible, the holders of these tokens will be unable to convert them to native coins in the case that the Tesseract platform is destroyed. A full version of Tesseract, which is distributed and hence highly unlikely to fail, is described below in conjunction with FIGS. 15-19. It is also possible to incorporate a timeout to the reserve outputs that specifies that the coins will be controlled by, for example, a multisig of several reputable parties if Tesseract stops updating the reserve outputs and thus the time expiration is reached. However, this gives an incentive to these several parties to destroy the Tesseract platform and collect the reserve coins.

In some embodiments, exchanges of cryptocurrency for fiat currencies is supported. For fiat currency transactions that are done via the traditional banking system, it is problematic to offer integration with a protocol that is based on cryptographic assumptions. One reason for this is that fiat transactions can be reversed as a result of human intervention (e.g., in the course of investigating a complaint by a customer of a bank).

The problem can be outsourced by relying on a counterparty that provides recognizable tokens that can be transferred via the underlying cryptocurrency system, and are supposed to represent an equivalent amount of fiat currency. This approach enables fiat currency transfers that become irreversible just like the cryptocurrency payments, and depends on the reputation of the counterparty to redeem the token for the actual fiat currency. Some embodiments can be configured to utilize an instantiation such as Tether, which circulates tokens that are pegged to the U.S. dollar (involving proof-of-reserve) using the Omni layer on top of Bitcoin. The Tesseract service provider may even issue its own fiat tokens (by accepting traditional wire transfers of fiat currency), and other platforms and users may assign value to the tokens if they consider this Tesseract service provider to be trustworthy.

The SGX enclave of Tesseract can thus support assets that are redeemable for fiat currencies, by recognizing certain predefined types of tokens in the deposit transactions. In the case that the cryptocurrency (in which such an asset circulates) supports tagging-based colored coins, the validation predicate for the deposit is easy to implement. This is because the predicate would inspect only the current deposit transaction, rather than also inspecting prior transfers of ownership that ended up as this deposit. For non-tagging-based colored coins, Tesseract would need to run a full node inside an SGX enclave, which is far more demanding than running a simplified payment verification (SPV) client (the Tesseract enclave operation described previously may be implemented as an SPV client). Tagging-based colored coins require miners and full nodes to perform a moderate amount of extra work (only for colored transactions), which is not yet supported on cryptocurrencies such as Bitcoin and Litecoin. However, Ethereum already supports the equivalent of tagging-based colored coins, in the form of the above-noted ERC20 smart contract. As indicated previously, some implementations of Tesseract are configured to supports ERC20 assets as well.

Accordingly, in addition to allowing users to trade one cryptocurrency for another, Tesseract can also let the users trade cryptocurrencies for traditional assets that have a digital representation (in particular fiat currencies), though this capability involves trust in the reputation of the issuers of the assets.

Figure 15:
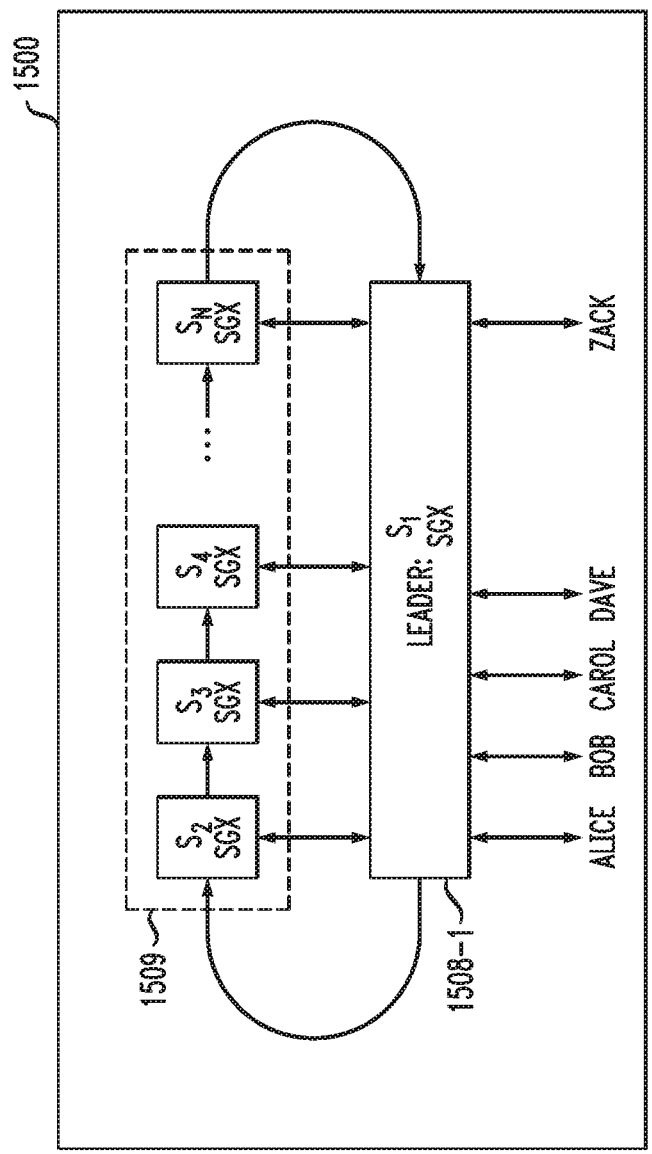
FIG. 15 is a block diagram of a processing platform comprising a plurality of processing devices implementing respective servers carrying out a leader election protocol in an illustrative embodiment.

FIG. 15 shows an information processing system 1500 in which the Tesseract exchange service is initialized with a particular one of N servers, illustratively a first server 1508-1, also denoted SGX server $S_1$, as its current leader. The server $S_1$ executes a Paxos consensus protocol together with the remaining servers 1509, also denoted as respective other SGX servers $S_2$, $S_3$, ..., $S_N$. The Paxos protocol is described in Leslie Lamport, "The part-time parliament," ACM Transactions on Computer Systems, 16(2):133-169, 1998, which is incorporated by reference herein. Other types of consensus arrangements can be used in other embodiments.

The typical requirements that the Paxos protocol relies upon are satisfied in our setting, because of the following reasons:

1. Authenticated channels exist as the messages that each SGX server sends are signed via remote attestation.

2. Byzantine faults may not occur (unless the SGX signing key is compromised), since the servers are running correct code.

FIG. 16 shows the outline of the complete Tesseract protocol $\Pi_{RTExch}$. To accomplish all-or-nothing settlements, $\Pi_{RTExch}$ uses $\Pi_{prac}$ as a subroutine. As with $\Pi_{prac}$, the SGX servers $S_1, S_2, \ldots, S_N$ need to share a symmetric secret key sk that is known only to their enclaves. The exemplary parameters $d_0=5$, $n_0=288$ mean that the all-or-nothing settlements are done once every 24 hours (288·5 minutes).

Thus, in the case of a DoS attack on $\Pi_{RTExch}$, $d_0=5$ implies that trades in the last 5 minutes (or less) will be lost when the newly elected leader resumes the trading service for the users.

The protocol $\Pi_{RTExch}$ is configured to ensure that there will never be two different servers $S_i$ and $S_{i'}$ that consider themselves to be the leader of the same epoch. If this were the case, $S_i$ and $S_{i'}$ could broadcast inconsistent transactions to the cryptocurrency networks $C_1$, $C_2$ during a settlement epoch, which can easily violate the all-or-nothing guarantee. Such an inconsistency cannot occur because $\Pi_{RTExch}$ specifies that the leader $S_L$ needs acknowledgements from a majority of the servers before proceeding to Step 3 of $\Pi_{prac}$, and therefore the transaction $TX_1$ will never be released by two different leaders.

Hence, $\Pi_{RTExch}$ can be regarded as a composition of two protocols, one is the Paxos protocol that guarantees consistency among the servers, and the other is the all-or-nothing fairness protocol that interacts with the cryptocurrency systems. In each of the two protocols, liveness is ensured if the network is synchronous and there is a majority of non-faulty servers, and the same holds also for the composition. Since only non-Byzantine faults are possible (due to SGX), all-or-nothing fairness holds even if of all the servers become faulty.

If the leader or any other server $S_i$ crashes and does not recover quickly enough, another server $S_j$ will be the leader in the case that $S_i$ comes back online (using the same endorsement and hardware keys that the other servers expect). Then, $S_i$ will synchronize with the enclave data m that the current leader $S_j$ maintains, and will be able to continue its participation in the execution of the $\Pi_{RTExch}$ protocol.

To achieve maximum security, we configure the initialization procedure for $\Pi_{RTExch}$ as follows. Our enclave program code $P_{RTExch}$ contains a hardcoded list of N endorsement public keys $RPK_1$, $RPK_2$, ..., $RPK_N$, corresponding to the reputable owners of the N servers (e.g., $S_1$ is located at Cornell University, $S_2$ is located at MIT, and so on). When the enclave of $S_i$ is loaded with $P_{RTExch}$, the code first acquires entropy and generates a fresh key pair ($tpk_i$, $tsk_i$), and then outputs $tpk_i$ together with an encryption encrypt ($tsk_i$) that is created using the symmetric hardware key of the SGX CPU of $S_i$. The owner keeps a backup of encrypt($tsk_i$), sends $tpk_i$ to $\{S_j\}_{j \neq i}$, waits to receive $\{tpk_j\}_{j \neq i}$, signs $m=(tpk_1, tpk_2, \ldots, tpk_N)$ with $RSK_i$, and sends the signature $es_i$ to $\{S_j\}_{j \neq i}$. The enclave of $S_i$ waits to receive the endorsed list of fresh keys (m, $es_1$, $es_2$, ..., $es_N$), and stores this list as immutable data. Following that, the enclave of $S_i$ establishes secure channels (e.g., using TLS) with each other server $S_j$ via the identities $tpk_i$ and $tpk_j$.

If the enclave of $S_i$ is re-initialized to create a different identity $tpk'_i$, it will not be able to communicate with the enclaves of $\{S_j\}_{j \neq i}$ that are still running. However, $S_i$ can recover from a crash failure by restarting the enclave program $P_{RTExch}$ with m, encrypt($tsk_i$), and otherwise a blank slate, then re-establish the TLS channels $\{S_j\}_{j \neq i}$ and wait to receive the latest data from the current leader.

This way, when the Tesseract platform is launched, the sensitive reputation key $RSK_i$ is used only once to endorse the physical machine that hosts the ith enclave in order to avoid man-in-the-middle attacks, and $S_1$ can continue to be part of the platform as long as its SGX CPU is undamaged.

FIGS. 17, 18 and 19 show example pseudocode for implementing respective portions of the protocol $\Pi_{RTExch}$ of FIG. 16.

In some embodiments disclosed herein, a given blockchain transaction is illustratively configured to provide a time-locked fail-safe mechanism, in that the transaction stores a valid state from the secure enclave to the blockchain that is only allowed to be applied once a given amount of time and/or a given number of blocks have elapsed. Advantageously, this time-lock is ensured by the blockchain itself. As a result, if the Tesseract platform loses connectivity for some time or otherwise becomes unavailable, users can trigger this fail-safe state. Numerous other time-locked fail-safe arrangements are possible in other embodiments.

As described previously, the Tesseract exchange in illustrative embodiments is configured to periodically perform on-chain settlement transactions, for example, in order to update account balances of users.

Assume by way of example that a given implementation of the Tesseract exchange has n users. Let $B_i$ be the Bitcoin balance of the i-th user in the exchange. As users trade, their respective balances $B_i$ get updated. Once per time period t (e.g., t=24 h), the exchange will synchronize the balances with the blockchain. If the exchange goes down, users can withdraw their balance after a certain timeout T expires.

Some embodiments are configured such that the exchange maintains, for each user, a UTXO that is spendable by the following script: (signed by the exchange's private key) OR (T expired AND signed by the user's private key). Also, for every time period t, we generate a large transaction signed by the exchange that consumes all the above-noted UTXOs and generates new ones with updated balances and an updated timeout.

This approach has two potential downsides in some embodiments. First, these large transactions signed by the exchange increase in size with the number of users n, and can therefore be expensive. Second, because we generally want atomic updates, we cannot split the transaction into multiple smaller transactions. But once we have too many users, the transactions will be too large to fit into a block.

These downsides can potentially allow an adversary to perform a DoS attack where the adversary creates a large number of accounts on the Tesseract exchange (e.g., causing the total number of user accounts to well exceed about 100,000 accounts), so that the update transactions become too large to fit into a block.

In some embodiments, these drawbacks can be overcome utilizing covenants and/or Merkelized Abstract Syntax Trees (MASTs). However, such features are not currently available in Bitcoin.

An alternative approach that is inexpensive, can readily support an arbitrary number of users, and requires no modifications to Bitcoin, involves the Tesseract exchange maintaining a single UTXO that is spendable by the following script: (signed by the exchange's key pair) OR (T expired AND signed by ephemeral key pair). This single UTXO has a value given by $\Sigma_{i=1}^n B_i$. We then recursively create a set of transactions that splits this single UTXO into two UTXOs (each spendable by a fresh ephemeral key) until we arrive at leaf-UTXOs which are spendable by the individual users. More particularly, the i-th leaf-UTXO has value $B_i$ and is spendable by the following script: (signed by i-th user's key pair). For each of the time periods t for which the Tesseract exchange synchronizes its user account balance state with the blockchain, it publishes this set of pre-signed transactions. For example, to make sure that the pre-signed transactions remain available we can distribute them to the servers $S_1, S_2, \ldots, S_N$, although such an arrangement requires somewhat stronger assumptions.

In an embodiment of this type, users do not need to transfer or download large amounts of transaction data, as each user only needs the branch of transactions leading to that user's corresponding output. In the optimistic case in which the Tesseract exchange remains functional, this approach is inexpensive, as the on-chain transactions remain small and of constant size. In the pessimistic case in which the Tesseract exchange goes down, users can submit the pre-signed transactions to get their money back. A single user will have to send at most O(log(n)) transactions to get his or her money back.

Figure 20:
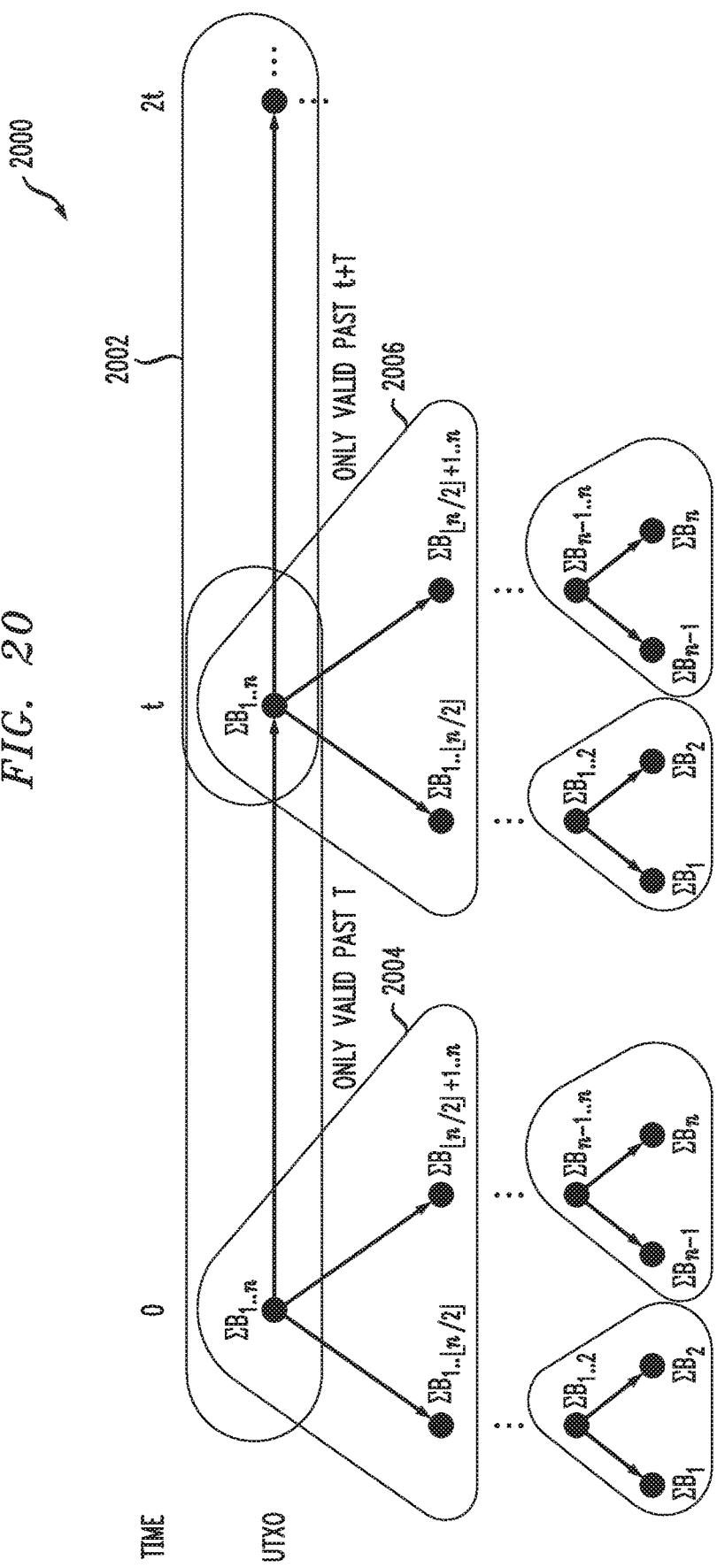
FIG. 20 illustrates a tree structure showing relationships between transactions in another embodiment.

FIG. 20 illustrates a tree structure 2000 showing relationships between transactions in an embodiment of the type described above. The nodes of the tree structure 2000 more particularly denote respective UTXOs, and edges in the tree structure 2000 denote the flow of Bitcoin. The set of transactions 2002 is executed if the Tesseract exchange remains functional, while the sets of transactions 2004 and 2006, as well as other lower level transactions illustrated in the figure, are pre-signed by the Tesseract exchange and can be submitted by users in case the Tesseract exchange goes down.

This embodiment and other similar arrangements illustratively assume that the underlying blockchain is not vulnerable to third-party transaction malleability, and are generally applicable to a wide variety of different cryptocurrency systems. For example, such arrangements are applicable to Bitcoin and other Bitcoin-like blockchains such as Litecoin that utilize a UTXO model. It is also applicable to cryptocurrency systems such as Ethereum that support smart contracts, but for such systems the implementation is simplified as users can present a message signed by the enclave to a smart contract.

It is to be appreciated that the various embodiments disclosed herein are presented by way of illustrative example only, and should not be construed as limiting in any way. For example, the example real-time cryptocurrency exchange protocols and their particular features and implementation details as described above are considered illustrative embodiments only. Numerous alternative arrangements for implementing cryptocurrency exchanges using trusted hardware can be utilized in other embodiments.

As is apparent from the above description, illustrative embodiments can provide significant advantages relative to conventional approaches. For example, some embodiments provide a processing platform that implements a real-time cryptocurrency exchange service configured to prevent frontrunning attacks as well as other types of attacks that could lead to theft or other loss of cryptocurrency assets.

A given such embodiment illustratively provides secure real-time cross-trading between multiple independent cryptocurrency systems. These and other embodiments are advantageously configured to ensure "all-or-nothing" fairness in conjunction with exchanges of cryptocurrency assets of different cryptocurrency systems.

Similar advantages are provided for other types of cryptocurrency transactions in other contexts involving one or more cryptocurrency systems. For example, some embodiments are configured to tokenize assets that are pegged to various cryptocurrencies. As a more particular example, a given illustrative embodiment of this type can be configured to tokenize Bitcoin-denominated cryptocurrency assets for circulation on the Ethereum blockchain in order to facilitate usage of those assets in smart contracts. Numerous other cryptocurrency processing contexts are improved in other embodiments.

In some embodiments, cryptocurrency exchange services are implemented in a manner that does not require immediate on-chain settlement of all trades. These embodiments therefore advantageously avoid the poor throughput and latency typically associated with such immediate on-chain settlement.

Moreover, illustrative embodiments are not limited to blockchain-based cryptocurrencies such as Bitcoin, Ethereum or Litecoin that utilize consensus protocols based on PoW. For example, some embodiments are configured to support exchanges involving one or more proof-of-stake based cryptocurrencies and/or proof-of-space based cryptocurrencies.

The above-described advantages and other advantages referred to herein are found in certain illustrative embodiments, and need not be present in other embodiments.

Accordingly, the embodiments described above are considered illustrative only, and should not be viewed as limited to any particular arrangement of features. For example, those skilled in the art will recognize that alternative processing operations and associated system entity configurations can be used in other embodiments. It is therefore possible that other embodiments may include additional or alternative system entities, relative to the entities of the illustrative embodiments. Also, the particular inputs, computations, outputs and other aspects of the illustrative protocols can be varied in other embodiments.

It should also be noted that the above-described information processing system arrangements are exemplary only, and alternative system arrangements can be used in other embodiments.

A given client, server, processor or other component in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, an ALU, a GPU, a DSP, or other similar processing device component, as well as other types and arrangements of processing circuitry, in any combination. For example, a given cryptographic processing module of a processing device as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with real-time cryptocurrency exchange as well as other related functionality.

Processing devices in a given embodiment can include, for example, laptop, tablet or desktop personal computers, mobile telephones, or other types of computers or communication devices, in any combination. For example, a computer or mobile telephone can be utilized by a user to initiate real-time cryptocurrency exchange processing of the type disclosed herein. These and other communications between the various elements of an information processing system comprising processing devices associated with respective system entities may take place over one or more networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Other types of virtualization may additionally or alternatively be used in a given processing platform in illustrative embodiments. For example, Docker containers or other types of containers implemented using respective kernel control groups of an operating system of a given processing device may be used. It is also possible for such containers to run on virtual machines controlled by a hypervisor.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines, such as operating system based virtualization infrastructure comprising containers implemented using respective kernel control groups.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain types of functionality associated with real-time cryptocurrency exchange processing of a given processing device can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed real-time cryptocurrency exchange techniques to provide additional or alternative functionality in other contexts.

Thus, techniques illustrated in some embodiments herein in the context of implementing real-time cryptocurrency exchange for cryptocurrencies such as Bitcoin, Litecoin and Ethereum can be adapted in a straightforward manner for use in other contexts involving additional or alternative cryptocurrencies as well as other types of currency systems. For example, some embodiments can be configured to support real-time exchanges between one or more cryptocurrencies and one or more fiat currencies.

It is also to be appreciated that the particular process steps used in the embodiments described above are exemplary only, and other embodiments can utilize different types and arrangements of processing operations. For example, certain process steps shown as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and devices than those utilized in the particular illustrative embodiments described herein, and in numerous alternative real-time cryptocurrency exchange contexts. In addition, the particular assumptions made herein in the context of describing certain embodiments need not apply in other embodiments. These and numerous other alternative embodiments will be readily apparent to those skilled in the art.

What is claimed is:

1. An apparatus comprising:
a processing platform comprising at least a first processing device and a second processing device each comprising a processor coupled to a memory;
the processing platform being configured to communicate over at least one network with one or more additional sets of processing devices associated with at least a first blockchain-based cryptocurrency system;
each of the first and second processing devices of the processing platform comprising a trusted execution environment, the trusted execution environment comprising a hardware-based execution environment of the processor of the corresponding processing device;
wherein one or more of the first processing device and the second processing device are configured, via program code comprising instructions stored in the memory and executed by the processor of the corresponding processing device, to;
construct in the trusted execution environment of the first processing device a first blockchain transaction on the first blockchain-based cryptocurrency system;
construct in the trusted execution environment of the first processing device a second blockchain transaction relating to the first blockchain transaction;
generate, by the trusted execution environment of the first processing device, a ciphertext based at least in part on the first and second blockchain transactions constructed therein;
provide the ciphertext to the trusted execution environment of the second processing device;
release from the trusted execution environment of one of the first and second processing devices the first blockchain transaction on the first blockchain-based cryptocurrency system; and
condition release, from the trusted execution environment of one of the first and second processing devices, of the second blockchain transaction relating to the first blockchain transaction on receipt of at least a specified threshold amount of evidence of confirmation of the first blockchain transaction on the first blockchain-based cryptocurrency system, the conditioned release of the second blockchain transaction being controlled based at least in part on the ciphertext provided to the trusted execution environment of the second processing device.

2. The apparatus of claim 1 wherein the trusted execution environment comprises a secure enclave of its corresponding processing device.

3. The apparatus of claim 2 wherein the secure enclave is implemented at least in part utilizing one or more hardware-based isolation mechanisms of the processor of the corresponding processing device.

4. The apparatus of claim 1 wherein the first and second blockchain transactions collectively implement an exchange of a first amount of cryptocurrency in the first blockchain-based cryptocurrency system for a second amount of cryptocurrency in the first blockchain-based cryptocurrency system.

5. The apparatus of claim 1 wherein the second blockchain transaction is on a second blockchain-based cryptocurrency system different than the first blockchain-based cryptocurrency system.

6. The apparatus of claim 5 wherein the first and second blockchain transactions collectively implement an exchange of a first amount of cryptocurrency in the first blockchain-based cryptocurrency system for a second amount of cryptocurrency in the second blockchain-based cryptocurrency system.

7. The apparatus of claim 1 wherein a first trusted execution environment of the first processing device is configured:
to release the first blockchain transaction on the first blockchain-based cryptocurrency system;
responsive to receipt of at least the specified threshold amount of evidence of confirmation of the first blockchain transaction on the first blockchain-based cryptocurrency system, to release the second blockchain transaction on a second blockchain-based cryptocurrency system;
responsive to receipt of at least a specified threshold amount of evidence of confirmation of the second blockchain transaction on the second blockchain-based cryptocurrency system, to release first secret information generated in the first trusted execution environment; and
responsive to receipt of at least a specified threshold amount of evidence of confirmation of an update of the first blockchain transaction on the first blockchain-based cryptocurrency system with witness information satisfying a designated predicate, to release second secret information generated in the first trusted execution environment.

8. The apparatus of claim 1 wherein the processing devices of the processing platform comprise:
a first processing device comprising a first trusted execution environment; and
a plurality of other processing devices implementing respective servers of the processing platform;
the servers being implemented via program code comprising instructions stored in the memory and executed by the processor of corresponding respective ones of the other processing devices.

9. The apparatus of claim 8 wherein each of the other processing devices of the processing platform comprises a corresponding trusted execution environment, and wherein the first processing device and the plurality of other processing devices share at least one cryptographic key that is secured within their respective trusted execution environments.

10. The apparatus of claim 8 wherein the first trusted execution environment of the first processing device is configured:
to generate the ciphertext as an encryption of:
the first blockchain transaction;
the second blockchain transaction;
a cancellation transaction for the first blockchain transaction; and
a cancellation transaction for the second blockchain transaction; and to send the ciphertext to each of the servers;
wherein the first processing device broadcasts the first blockchain transaction on the first blockchain-based cryptocurrency system responsive to acknowledgement of receipt of the ciphertext by at least a specified threshold number of the servers.

11. The apparatus of claim 10 wherein each of the servers is configured, via the program code comprising instructions stored in the memory and executed by the processor of its corresponding one of the other processing devices:
responsive to a failure to detect confirmation of the first blockchain transaction on the first blockchain-based cryptocurrency system within a designated number of blocks, to broadcast the cancellation transaction for the first blockchain transaction on the first blockchain-based cryptocurrency system;
responsive to detection of confirmation of the first blockchain transaction on the first blockchain-based cryptocurrency system, to broadcast the second blockchain transaction on a second blockchain-based cryptocurrency system; and
responsive to detection of confirmation of the cancellation transaction for the first blockchain transaction on the first blockchain-based cryptocurrency system, to broadcast the cancellation transaction for the second blockchain transaction on the second blockchain-based cryptocurrency system.

12. The apparatus of claim 1 wherein the processing devices of the processing platform comprise:
a plurality of processing devices implementing respective servers of the processing platform;
each of the processing devices comprising a corresponding trusted execution environment;
the servers being implemented via program code comprising instructions stored in the memory and executed by the processor of corresponding respective ones of the processing devices;
wherein the processing devices share at least one cryptographic key that is secured within their respective trusted execution environments.

13. The apparatus of claim 12 wherein each of the servers is configured to execute a corresponding instance of a leader election protocol that under specified conditions rotates a leader designation among the servers.

14. The apparatus of claim 13 wherein a given one of the servers currently designated as a leader is configured:
to encrypt enclave data of its corresponding trusted execution environment;
to send the encrypted enclave data to each of the other servers;
to send to each of the other servers a ciphertext comprising an encryption of:
the first blockchain transaction;
the second blockchain transaction;
a cancellation transaction for the first blockchain transaction; and
a cancellation transaction for the second blockchain transaction; and
to broadcast the first blockchain transaction on the first blockchain-based cryptocurrency system responsive to acknowledgement of receipt of the ciphertext by at least a specified threshold number of the other servers.

15. The apparatus of claim 1 wherein a given one of the first and second blockchain transactions is configured to provide a time-locked fail-safe mechanism by storing a valid state from the trusted execution environment to a blockchain of the corresponding blockchain-based cryptocurrency system wherein the valid state is applied only after at least one of a given amount of time and a given number of blocks have elapsed.

16. A method comprising:
configuring a processing platform comprising at least a first processing device and a second processing device, each of the first and second processing devices comprising a processor coupled to a memory and each comprising a trusted execution environment, the trusted execution environment comprising a hardware-based execution environment of the processor of the corresponding processing device, to communicate over at least one network with one or more additional sets of processing devices associated with at least a first blockchain-based cryptocurrency system;
constructing in the trusted execution environment of the first processing device a first blockchain transaction on the first blockchain-based cryptocurrency system;
constructing in the trusted execution environment of the first processing device a second blockchain transaction relating to the first blockchain transaction;
generating, by the trusted execution environment of the first processing device, a ciphertext based at least in part on the first and second blockchain transactions constructed therein;
providing the ciphertext to the trusted execution environment of the second processing device;
releasing from the trusted execution environment of one of the first and second processing devices the first blockchain transaction on the first blockchain-based cryptocurrency system; and
conditioning release, from the trusted execution environment of one of the first and second processing devices, of the second blockchain transaction relating to the first blockchain transaction on receipt of at least a specified threshold amount of evidence of confirmation of the first blockchain transaction on the first blockchain-based cryptocurrency system, the conditioned release of the second blockchain transaction being controlled based at least in part on the ciphertext provided to the trusted execution environment of the second processing device.

17. The method of claim 16 wherein the second blockchain transaction is on a second blockchain-based cryptocurrency system different than the first blockchain-based cryptocurrency system.

18. The method of claim 17 wherein the first and second blockchain transactions collectively implement an exchange of a first amount of cryptocurrency in the first blockchain-based cryptocurrency system for a second amount of cryptocurrency in the second blockchain-based cryptocurrency system.

19. A computer program product comprising at least one non-transitory processor-readable storage medium having stored therein program code of one or more software programs, wherein the program code when executed by a processing platform comprising at least a first processing device and a second processing device, each of the first and second processing devices comprising a processor coupled to a memory and each comprising a trusted execution environment, the trusted execution environment comprising a hardware-based execution environment of the processor of the corresponding processing device, the processing platform being configured to communicate over at least one network with one or more additional sets of processing devices associated with at least a first blockchain-based cryptocurrency system, causes one or more of the first and second processing devices to:

construct in the trusted execution environment of the first processing device a first blockchain transaction on the first blockchain-based cryptocurrency system;

construct in the trusted execution environment of the first processing device a second blockchain transaction relating to the first blockchain transaction;

generate, by the trusted execution environment of the first processing device, a ciphertext based at least in part on the first and second blockchain transactions constructed therein;

provide the ciphertext to the trusted execution environment of the second processing device;

release from the trusted execution environment of one of the first and second processing devices the first blockchain transaction on the first blockchain-based cryptocurrency system; and condition release, from the trusted execution environment of one of the first and second processing devices, of the second blockchain transaction relating to the first blockchain transaction on receipt of at least a specified threshold amount of evidence of confirmation of the first blockchain transaction on the first blockchain-based cryptocurrency system, the conditioned release of the second blockchain transaction being controlled based at least in part on the ciphertext provided to the trusted execution environment of the second processing device.

20. The computer program product of claim 19 wherein the second blockchain transaction is on a second blockchain-based cryptocurrency system different than the first blockchain-based cryptocurrency system.

21. The computer program product of claim 20 wherein the first and second blockchain transactions collectively implement an exchange of a first amount of cryptocurrency in the first blockchain-based cryptocurrency system for a second amount of cryptocurrency in the second blockchain-based cryptocurrency system.

* * * * *